United States Patent
Kuno et al.

(10) Patent No.: US 7,554,583 B2
(45) Date of Patent: Jun. 30, 2009

(54) PIXEL SIGNAL PROCESSOR AND PIXEL SIGNAL PROCESSING METHOD

(75) Inventors: Tetsuya Kuno, Tokyo (JP); Junko Makita, Tokyo (JP); Hiroaki Sugiura, Tokyo (JP); Narihiro Matoba, Tokyo (JP); Masashi Tamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 565 days.

(21) Appl. No.: 10/582,501

(22) PCT Filed: Jul. 22, 2005

(86) PCT No.: PCT/JP2005/013454

§ 371 (c)(1),
(2), (4) Date: Jun. 9, 2006

(87) PCT Pub. No.: WO2006/048962

PCT Pub. Date: May 11, 2006

(65) Prior Publication Data

US 2007/0019087 A1     Jan. 25, 2007

(30) Foreign Application Priority Data

Nov. 4, 2004   (JP) .................. 2004-320181

(51) Int. Cl.
 *H04N 9/07*  (2006.01)
 *H04N 9/083*  (2006.01)
(52) U.S. Cl. .............. 348/241; 348/272; 382/300; 382/162; 382/167; 358/525
(58) Field of Classification Search ........... 382/300, 382/162, 167; 358/525; 348/272, 273, 280, 348/281
See application file for complete search history.

(56) References Cited

U.S. PATENT DOCUMENTS 4,630,307 A    12/1986   Cok (Continued)

FOREIGN PATENT DOCUMENTS

JP    11-168744 A    6/1999

(Continued)

*Primary Examiner*—Jefferey F Harold
*Assistant Examiner*—Dwight Alex C Tejano
(74) *Attorney, Agent, or Firm*—Birch, Stewart, Kolasch & Birch, LLP

(57) ABSTRACT

A pixel signal having a k-th spectral characteristic at a pixel interpolation position occupied by a pixel signal having an h-th spectral characteristic is generated from a set of pixel signals arrayed in a two-dimensional plane, each having one of a plurality of spectral characteristics, by calculating a difference between low-frequency components, corresponding to a degree of correlation between pixel signals having the k-th and h-th spectral characteristics in a neighborhood of the pixel interpolation position (8r, 8g, 8b, 24k, 24h, 26), calculating a non-correlation value corresponding to a degree of non-correlation between the pixel signals having the k-th and h-th spectral characteristics in the neighborhood of the pixel interpolation position (7r, 7g, 7b, 23k, 23h, 25), and obtaining the pixel signal having the k-th spectral characteristic at the pixel interpolation position by using the calculated difference and the non-correlation value (27, 28, 29). Accurate interpolation can be performed despite various different correlation relationships between color component values.

10 Claims, 15 Drawing Sheets

U.S. PATENT DOCUMENTS

| | | |
|---|---|---|
| 4,642,678 A | 2/1987 | Cok |
| 5,373,322 A | 12/1994 | Laroche et al. |
| 5,382,976 A | 1/1995 | Hibbard |
| 6,415,053 B1 * | 7/2002 | Norimatsu ............... 382/199 |
| 6,493,029 B1 * | 12/2002 | Denyer et al. ............ 348/236 |
| 6,714,242 B1 * | 3/2004 | Kobayashi ............... 348/272 |
| 2001/0045988 A1 * | 11/2001 | Yamauchi et al. ......... 348/273 |
| 2003/0025814 A1 * | 2/2003 | Hunter et al. ............ 348/272 |
| 2004/0085458 A1 * | 5/2004 | Yanof et al. ............ 348/223.1 |

FOREIGN PATENT DOCUMENTS

| | | |
|---|---|---|
| JP | 11-177997 A | 7/1999 |
| JP | 11-220742 A | 8/1999 |
| JP | 11-243554 A | 9/1999 |
| JP | 2001-78211 A | 3/2001 |
| JP | 2001-86523 A | 3/2001 |
| JP | 2001-197512 A | 7/2001 |
| JP | 2002-112276 A | 4/2002 |
| JP | 2002-525722 A | 8/2002 |
| JP | 2003-92765 A | 3/2003 |
| WO | WO-00/16261 A1 | 3/2000 |

* cited by examiner

FIG.2

|   | i−3 | i−2 | i−1 | i | i+1 | i+2 | i+3 |
|---|---|---|---|---|---|---|---|
| j−3 | R | G | R | G | R | G | R |
| j−2 | G | B | G | B | G | B | G |
| j−1 | R | G | R | G | R | G | R |
| j | G | B | G | B | G | B | G |
| j+1 | R | G | R | G | R | G | R |
| j+2 | G | B | G | B | G | B | G |
| j+3 | R | G | R | G | R | G | R |

FIG.3

|   | i−3 | i−2 | i−1 | i | i+1 | i+2 | i+3 |
|---|---|---|---|---|---|---|---|
| j−3 | R |   | R |   | R |   | R |
| j−2 |   |   |   |   |   |   |   |
| j−1 | R |   | R |   | R |   | R |
| j |   |   |   |   |   |   |   |
| j+1 | R |   | R |   | R |   | R |
| j+2 |   |   |   |   |   |   |   |
| j+3 | R |   | R |   | R |   | R |

FIG.4

|   | i−3 | i−2 | i−1 | i | i+1 | i+2 | i+3 |
|---|---|---|---|---|---|---|---|
| j−3 |   | G |   | G |   | G |   |
| j−2 | G |   | G |   | G |   | G |
| j−1 |   | G |   | G |   | G |   |
| j | G |   | G |   | G |   | G |
| j+1 |   | G |   | G |   | G |   |
| j+2 | G |   | G |   | G |   | G |
| j+3 |   | G |   | G |   | G |   |

|   | i−3 | i−2 | i−1 | i | i+1 | i+2 | i+3 |
|---|---|---|---|---|---|---|---|
| j−3 |   |   |   |   |   |   |   |
| j−2 |   | B |   | B |   | B |   |
| j−1 |   |   |   |   |   |   |   |
| j |   | B |   | B |   | B |   |
| j+1 |   |   |   |   |   |   |   |
| j+2 |   | B |   | B |   | B |   |
| j+3 |   |   |   |   |   |   |   |

|  | i−3 | i−2 | i−1 | i | i+1 | i+2 | i+3 |
|---|---|---|---|---|---|---|---|
| j−3 | RLPF | RLPF | RLPF | RLPF | RLPF | RLPF | RLPF |
| j−2 | RLPF | RLPF | RLPF | RLPF | RLPF | RLPF | RLPF |
| j−1 | RLPF | RLPF | RLPF | RLPF | RLPF | RLPF | RLPF |
| j | RLPF | RLPF | RLPF | RLPF | RLPF | RLPF | RLPF |
| j+1 | RLPF | RLPF | RLPF | RLPF | RLPF | RLPF | RLPF |
| j+2 | RLPF | RLPF | RLPF | RLPF | RLPF | RLPF | RLPF |
| j+3 | RLPF | RLPF | RLPF | RLPF | RLPF | RLPF | RLPF |

FIG.7

|  | i−3 | i−2 | i−1 | i | i+1 | i+2 | i+3 |
|---|---|---|---|---|---|---|---|
| j−3 | GLPF | GLPF | GLPF | GLPF | GLPF | GLPF | GLPF |
| j−2 | GLPF | GLPF | GLPF | GLPF | GLPF | GLPF | GLPF |
| j−1 | GLPF | GLPF | GLPF | GLPF | GLPF | GLPF | GLPF |
| j | GLPF | GLPF | GLPF | GLPF | GLPF | GLPF | GLPF |
| j+1 | GLPF | GLPF | GLPF | GLPF | GLPF | GLPF | GLPF |
| j+2 | GLPF | GLPF | GLPF | GLPF | GLPF | GLPF | GLPF |
| j+3 | GLPF | GLPF | GLPF | GLPF | GLPF | GLPF | GLPF |

FIG.8

|  | i-3 | i-2 | i-1 | i | i+1 | i+2 | i+3 |
|---|---|---|---|---|---|---|---|
| j-3 | BLPF | BLPF | BLPF | BLPF | BLPF | BLPF | BLPF |
| j-2 | BLPF | BLPF | BLPF | BLPF | BLPF | BLPF | BLPF |
| j-1 | BLPF | BLPF | BLPF | BLPF | BLPF | BLPF | BLPF |
| j | BLPF | BLPF | BLPF | BLPF | BLPF | BLPF | BLPF |
| j+1 | BLPF | BLPF | BLPF | BLPF | BLPF | BLPF | BLPF |
| j+2 | BLPF | BLPF | BLPF | BLPF | BLPF | BLPF | BLPF |
| j+3 | BLPF | BLPF | BLPF | BLPF | BLPF | BLPF | BLPF |

FIG.9

|  | i-3 | i-2 | i-1 | i | i+1 | i+2 | i+3 |
|---|---|---|---|---|---|---|---|
| j-3 | RHPF | RHPF | RHPF | RHPF | RHPF | RHPF | RHPF |
| j-2 | RHPF | RHPF | RHPF | RHPF | RHPF | RHPF | RHPF |
| j-1 | RHPF | RHPF | RHPF | RHPF | RHPF | RHPF | RHPF |
| j | RHPF | RHPF | RHPF | RHPF | RHPF | RHPF | RHPF |
| j+1 | RHPF | RHPF | RHPF | RHPF | RHPF | RHPF | RHPF |
| j+2 | RHPF | RHPF | RHPF | RHPF | RHPF | RHPF | RHPF |
| j+3 | RHPF | RHPF | RHPF | RHPF | RHPF | RHPF | RHPF |

FIG.10

|  | i-3 | i-2 | i-1 | i | i+1 | i+2 | i+3 |
|---|---|---|---|---|---|---|---|
| j-3 | GHPF | GHPF | GHPF | GHPF | GHPF | GHPF | GHPF |
| j-2 | GHPF | GHPF | GHPF | GHPF | GHPF | GHPF | GHPF |
| j-1 | GHPF | GHPF | GHPF | GHPF | GHPF | GHPF | GHPF |
| j | GHPF | GHPF | GHPF | GHPF | GHPF | GHPF | GHPF |
| j+1 | GHPF | GHPF | GHPF | GHPF | GHPF | GHPF | GHPF |
| j+2 | GHPF | GHPF | GHPF | GHPF | GHPF | GHPF | GHPF |
| j+3 | GHPF | GHPF | GHPF | GHPF | GHPF | GHPF | GHPF |

FIG.11

|  | i-3 | i-2 | i-1 | i | i+1 | i+2 | i+3 |
|---|---|---|---|---|---|---|---|
| j-3 | BHPF | BHPF | BHPF | BHPF | BHPF | BHPF | BHPF |
| j-2 | BHPF | BHPF | BHPF | BHPF | BHPF | BHPF | BHPF |
| j-1 | BHPF | BHPF | BHPF | BHPF | BHPF | BHPF | BHPF |
| j | BHPF | BHPF | BHPF | BHPF | BHPF | BHPF | BHPF |
| j+1 | BHPF | BHPF | BHPF | BHPF | BHPF | BHPF | BHPF |
| j+2 | BHPF | BHPF | BHPF | BHPF | BHPF | BHPF | BHPF |
| j+3 | BHPF | BHPF | BHPF | BHPF | BHPF | BHPF | BHPF |

FIG.18

|     | i-3 | i-2 | i-1 | i  | i+1 | i+2 | i+3 |
|-----|-----|-----|-----|----|-----|-----|-----|
| j-3 | gr  | G   | gr  | G  | gr  | G   | gr  |
| j-2 | G   |     | G   |    | G   |     | G   |
| j-1 | gr  | G   | gr  | G  | gr  | G   | gr  |
| j   | G   |     | G   |    | G   |     | G   |
| j+1 | gr  | G   | gr  | G  | gr  | G   | gr  |
| j+2 | G   |     | G   |    | G   |     | G   |
| j+3 | gr  | G   | gr  | G  | gr  | G   | gr  |

FIG.19

|     | i-3 | i-2 | i-1 | i  | i+1 | i+2 | i+3 |
|-----|-----|-----|-----|----|-----|-----|-----|
| j-3 | gr  | G   | gr  | G  | gr  | G   | gr  |
| j-2 | G   | gb  | G   | gb | G   | gb  | G   |
| j-1 | gr  | G   | gr  | G  | gr  | G   | gr  |
| j   | G   | gb  | G   | gb | G   | gb  | G   |
| j+1 | gr  | G   | gr  | G  | gr  | G   | gr  |
| j+2 | G   | gb  | G   | gb | G   | gb  | G   |
| j+3 | gr  | G   | gr  | G  | gr  | G   | gr  |

FIG.20

|     | i-3 | i-2 | i-1 | i  | i+1 | i+2 | i+3 |
|-----|-----|-----|-----|----|-----|-----|-----|
| j-3 | R   | rg  | R   | rg | R   | rg  | R   |
| j-2 | rg  |     | rg  |    | rg  |     | rg  |
| j-1 | R   | rg  | R   | rg | R   | rg  | R   |
| j   | rg  |     | rg  |    | rg  |     | rg  |
| j+1 | R   | rg  | R   | rg | R   | rg  | R   |
| j+2 | rg  |     | rg  |    | rg  |     | rg  |
| j+3 | R   | rg  | R   | rg | R   | rg  | R   |

FIG.21

|     | i-3 | i-2 | i-1 | i  | i+1 | i+2 | i+3 |
|-----|-----|-----|-----|----|-----|-----|-----|
| j-3 |     | bg  |     | bg |     | bg  |     |
| j-2 | bg  | B   | bg  | B  | bg  | B   | bg  |
| j-1 |     | bg  |     | bg |     | bg  |     |
| j   | bg  | B   | bg  | B  | bg  | B   | bg  |
| j+1 |     | bg  |     | bg |     | bg  |     |
| j+2 | bg  | B   | bg  | B  | bg  | B   | bg  |
| j+3 |     | bg  |     | bg |     | bg  |     |

FIG.22

|     | i-3 | i-2 | i-1 | i  | i+1 | i+2 | i+3 |
|-----|-----|-----|-----|----|-----|-----|-----|
| j-3 | R   | rg  | R   | rg | R   | rg  | R   |
| j-2 | rg  | rb  | rg  | rb | rg  | rb  | rg  |
| j-1 | R   | rg  | R   | rg | R   | rg  | R   |
| j   | rg  | rb  | rg  | rb | rg  | rb  | rg  |
| j+1 | R   | rg  | R   | rg | R   | rg  | R   |
| j+2 | rg  | rb  | rg  | rb | rg  | rb  | rg  |
| j+3 | R   | rg  | R   | rg | R   | rg  | R   |

FIG.23

|     | i-3 | i-2 | i-1 | i  | i+1 | i+2 | i+3 |
|-----|-----|-----|-----|----|-----|-----|-----|
| j-3 | br  | bg  | br  | bg | br  | bg  | br  |
| j-2 | bg  | B   | bg  | B  | bg  | B   | bg  |
| j-1 | br  | bg  | br  | bg | br  | bg  | br  |
| j   | bg  | B   | bg  | B  | bg  | B   | bg  |
| j+1 | br  | bg  | br  | bg | br  | bg  | br  |
| j+2 | bg  | B   | bg  | B  | bg  | B   | bg  |
| j+3 | br  | bg  | br  | bg | br  | bg  | br  |

PIXEL SIGNAL PROCESSOR AND PIXEL SIGNAL PROCESSING METHOD

FIELD OF THE INVENTION

The present invention relates to a pixel signal processing apparatus and method, more particularly to a pixel signal processing apparatus and method for generating missing color components by interpolation to obtain a color image from a two-dimensional plane array of pixels each lacking at least one of the color components.

BACKGROUND ART

This type of pixel signal processing apparatus is used as part of a color imaging apparatus that also includes an imaging device having multiple types of photoelectric conversion elements, each generating the value of one of a plurality of color components, such as the three primary colors red (R), green (G), and blue (B), arranged in, for example, a Bayer array on a two-dimensional plane, to interpolate color component values that are lacking (missing color component values) at each pixel position according to the pixel signals output from the imaging device.

In conventional imaging apparatus having imaging devices with a Bayer array of red, green, and blue color filters, in which each pixel lacks the green and blue, blue and red, or red and green color component values, interpolation is performed to increase the sense of resolution by replacing the pixel signal of each pixel with a mean value based on the local distribution of pixel signals for each color, thereby employing an interpolation method based on an assumed linear similarity between the known color geometry and the missing color geometry, as shown, for example, in Patent Document 1 below.

Patent Document 1: Japanese Patent Application Publication No. 2001-197512 (paragraphs 0048 to 0049, FIG. 7)

DISCLOSURE OF THE INVENTION

Problems to be Solved by the Invention

This conventional method assumes a positive correlation among the color component values (e.g., the red, green, and blue component values in a Bayer array) in a neighborhood of the pixel to be interpolated. A consequent problem is that interpolation cannot be carried out properly in a region where there is no positive correlation between color component values (a boundary between one color and another color, for example), including both cases of no correlation and cases of negative correlation, which leads to large interpolation errors.

An object of the present invention is to provide a pixel signal processing apparatus capable of always carrying out interpolation by the optimal interpolation method regardless of how the color component values vary in a neighborhood of the pixel to be interpolated.

Means of Solution of the Problems

This invention provides a pixel signal processing apparatus for processing pixel signals from pixels arrayed in a two-dimensional plane, each pixel having a different one of N spectral characteristics, to generate an interpolated pixel signal having a k-th spectral characteristic at a pixel interpolation position occupied by a pixel having an h-th spectral characteristic, where h and k are positive integers between 1 and N, inclusive, the pixel signal processing apparatus comprising:

a difference calculation means for calculating a difference between a low-frequency component of pixel signals having the k-th spectral characteristic in a plurality of pixel positions in a neighborhood of the pixel interpolation position and a low-frequency component of pixel signals having the h-th spectral characteristic in a plurality of pixel positions in the neighborhood of the pixel interpolation position;

a non-correlation value calculating means for calculating a non-correlation value corresponding to a degree of non-correlation between the pixel signals having the k-th spectral characteristic and the pixel signals having the h-th spectral characteristic in the neighborhood of the pixel interpolation position; and an interpolated value calculating means for obtaining the pixel signal having the k-th spectral characteristic at the pixel interpolation position from the pixel signal having the h-th spectral characteristic at the pixel interpolation position, the difference, and the non-correlation value.

Effect of the Invention

This invention enables accurate interpolation to be performed despite various different correlations among color component values such as occur when the interpolated pixel is near a color boundary.

BRIEF DESCRIPTION OF THE DRAWINGS

FIG. 2 illustrates a Bayer array of red, green, and blue primary color filters;

FIG. 3 illustrates the red pixel arrangement on the image plane of the image sensor;

FIG. 4 illustrates the green pixel arrangement on the image plane of the image sensor;

FIG. 5 illustrates the blue pixel arrangement on the image plane of the image sensor;

FIG. 6 shows low-pass filtered red signal values;

FIG. 7 shows low-pass filtered green signal values;

FIG. 8 shows low-pass filtered blue signal values;

FIG. 9 shows high-pass filtered red signal values;

FIG. 10 shows high-pass filtered green signal values;

FIG. 11 shows high-pass filtered blue signal values;

FIG. 18 shows the arrangement of interpolated green pixel signals at the red pixel positions;

FIG. 19 shows the arrangement of interpolated green pixel signals at the blue pixel positions;

FIG. 20 shows the arrangement of interpolated red pixel signals at the green pixel positions;

FIG. 21 shows the arrangement of interpolated blue pixel signals at the green pixel positions;

FIG. 22 shows the arrangement of interpolated red pixel signals at the blue pixel positions;

FIG. 23 shows the arrangement of interpolated blue pixel signals at the red pixel positions;

Figure 1:
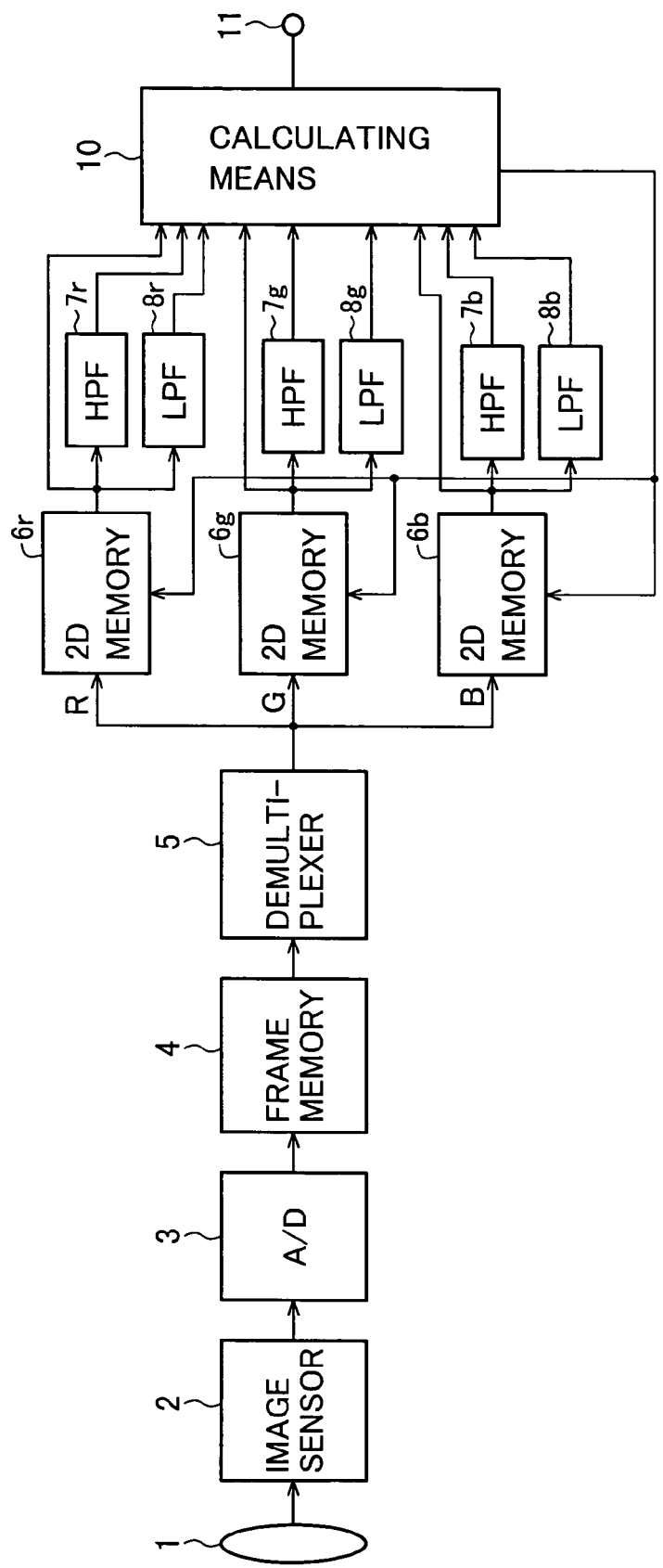
FIG. 1 is a block diagram showing the structure of an imaging apparatus having a pixel signal processing apparatus according to a first embodiment of the invention.

EXPLANATION OF REFERENCE CHARACTERS 1 lens, 2 image sensor, 3 analog-to-digital converter, 4 frame memory, 5 demultiplexer, 6r red signal two-dimensional memory, 6g green signal two-dimensional memory, 6b blue signal two-dimensional memory, 7r red signal high-pass filter (HPF), 8r red signal low-pass filter (LPF), 7g green signal HPF, 8g green signal LPF, 7b blue signal HPF, 8b blue signal LPF, 10 calculating means, 11 output terminal, 21, 23h, 23k, 24h, 24k selecting means, 25, 26 difference calculating means, 27, 28 coefficient multiplying means, 29 adding means, 30 control means, 32 ratio calculating means, 33 adding means, 34 multiplying means

BEST MODE OF PRACTICING THE INVENTION

Embodiments of this invention will now be described with reference to the attached drawings. The embodiments described below are suitable for use in a digital still camera, but applications of this invention are not limited thereto.

FIRST EMBODIMENT

FIG. 1 is a block diagram showing the structure of an imaging device having pixel signal processing apparatus according to the first embodiment of the invention.

Light incident on a lens 1 is focused on the image plane of, for example, a two-dimensional image sensor 2 comprising solid-state imaging elements. The image sensor 2 has a two-dimensional array of photoelectric conversion devices; the plurality of photoelectric conversion devices are covered by color filters having spectral characteristics corresponding, for example, to the red (R), green (G), and blue (B) primary colors arranged in a Bayer array, as shown in FIG. 2; each photoelectric conversion device outputs an analog signal representing a color component corresponding to the color of the color filter.

In FIG. 2, the horizontal axis and vertical axis respectively represent the horizontal direction (H) and vertical direction (V) in the image plane. The photoelectric conversion devices constitute pixels; each position occupied by a photoelectric conversion device corresponds to a pixel position. The pixels are arranged in a two-dimensional array on the image plane, so their positions can be represented by coordinate values in the HV coordinate plane (or HV plane). FIG. 2 shows only a portion of the image sensor, comprising seven rows and seven columns. The pixel at the center is represented by coordinate values (i, j), where i represents horizontal position and j represents vertical position. The neighboring pixels have horizontal (row) positions represented by i–3, i–2, . . . , i+3 and vertical (column) positions represented by j–3, j–2, . . . , j+3.

In the following discussion, a pixel corresponding to a photoelectric conversion device covered by a red (R) color filter is referred to as a red pixel, a pixel corresponding to a photoelectric conversion device covered by a green (G) color filter is referred to as a green pixel, and a pixel corresponding to a photoelectric conversion device covered by a blue (B) color filter is referred to as a blue pixel.

The image sensor 2 carries out photoelectric conversion of the light incident on each pixel and outputs an analog signal at a level according to the intensity of the incident light. The analog signal is converted to a digital signal and output by an analog-to-digital converter 3, and stored in a frame memory 4 as a color component (pixel signal) of the pixel. Each pixel signal is stored in association with its position on the image plane, i.e., a position on the HV coordinate plane.

As mentioned above, since the photoelectric conversion device constituting each pixel is covered by a filter, the device receives red, green, or blue light. The color of the light received by each photoelectric conversion device may be called the 'received color', and other colors may be called 'missing colors'.

Only a signal representing one color component, corresponding to the received color, can be obtained from the photoelectric conversion device that constitutes each pixel. For red pixels, the red component value is known but the green and blue components are unknown; for green pixels, the green component value is known but the blue and red component values are unknown; for blue pixels, the blue component value is known but the red and green component values are unknown. The unknown color component values at each pixel stored in the frame memory 4 may be referred to as missing color component values, because a color image can be reproduced by determining all three component values (red, green, and blue) at every pixel. The image signal processing according to the invention calculates the unknown color component values (missing color component values) at each pixel by interpolation.

The pixel signals stored in the frame memory 4 are demultiplexed by a demultiplexer 5 into red signals, green signals, and blue signals, which are stored separately in the two-dimensional (2D) memories 6r, 6g, 6b. Red signals are stored in two-dimensional memory 6r, green signals in two-dimensional memory 6g, and blue signals in two-dimensional memory 6b.

FIGS. 3, 4, and 5 show the arrangements of red pixels, green pixels, and blue pixels on the image plane of the image sensor 2. The signal of each pixel (color component value) is stored in association with its position on the image plane, i.e., the position on the HV coordinate plane, in the two-dimensional memories 6r, 6g, 6b. FIGS. 3, 4, and 5 therefore show the positions on the HV coordinate plane of the pixel signals demultiplexed by the demultiplexer 5 and stored in the memories.

The frame memory 4 is necessary when the image sensor 2 is a so-called interlaced scan sensor that reads out every second line, because this type of sensor must be read twice (two fields) to obtain all the pixel signals in one frame. When the image sensor 2 is a so-called progressive scan sensor that reads the pixels line by line in sequence from the top down in FIG. 2, the frame memory 4 can be omitted because the demultiplexer 5 can demultiplex the signal received directly from the image sensor 2.

Low-pass filters (LPFs) 8r, 8g, 8b are provided for the two-dimensional memories 6r, 6g, 6b to output low-frequency components of the pixel signals of each color read from the two-dimensional memories 6r, 6g, 6b. For each pixel, the low-pass filters 8r, 8g, 8b calculate low-frequency components of the pixel signals of each color in a neighborhood of the pixel, that is, the signals from a plurality of pixels in a range of pixel positions including the position of the pixel in question. The calculation method will be described later. FIGS. 6, 7, and 8 show examples of outputs from the low-pass filters 8r, 8g, 8b.

Similarly, high-pass filters (HPFs) 7r, 7g, 7b are provided for the two-dimensional memories 6r, 6g, 6b to output high-frequency components of the pixel signals of each color read from the two-dimensional memories 6r, 6g, 6b. For each pixel, the high-pass filters 7r, 7g, 7b calculate high-frequency components of the pixel signals of each color in a neighborhood of the pixel (a range of pixel positions including the position of the pixel in question). The calculation method will be described later. FIGS. 9, 10, and 11 show examples of outputs from the high-pass filters 7r, 7g, 7b.

As can be seen from FIGS. 6, 7, 8, 9, 10, and 11, the outputs from the low-pass filters 8r, 8g, 8b (RLPF, GLPF, BLPF) and outputs from the high-pass filters 7r, 7g, 7b (RHPF, GHPF, BHPF) are calculated for all pixels.

Based on the pixel signals read from the two-dimensional memories 6r, 6g, 6b, the outputs from the low-pass filters 8r, 8g, 8b, and the outputs from the high-pass filters 7r, 7g, 7b, a calculating means 10 calculates differences in low-frequency components and non-correlation values for each pixel and calculates the interpolated values.

Figure 12:
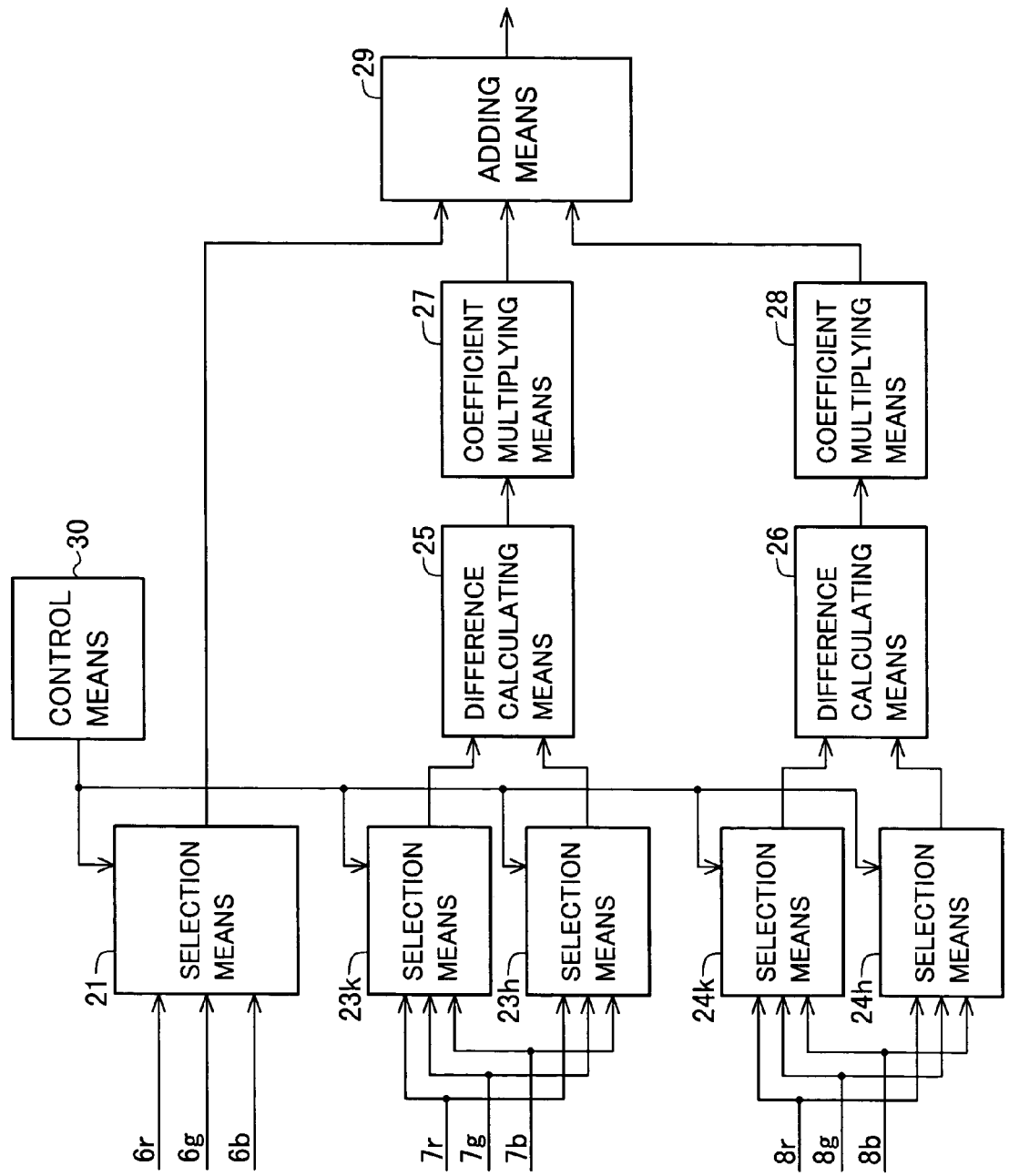
FIG. 12 is a block diagram showing the structure of the calculating means in the first embodiment.

The calculating means 10 has, for example, the structure shown in FIG. 12, including selection means 21, 23k, 23h, 24k, 24h, difference calculating means 25, 26, coefficient multiplying means 27, 28, an adding means 29, and a control means 30.

Selection means 21 selects one of the two-dimensional memories 6r, 6g, 6b and supplies pixel signals read from the selected two-dimensional memory 6r, 6g, or 6b to the adding means 29.

Selection means 23k receives the outputs RHPF, GHPF, BHPF from the high-pass filters 7r, 7g, 7b, and selects and outputs one of them. Selection means 23h also receives the outputs RHPF, GHPF, BHPF from the high-pass filters 7r, 7g, 7b, and selects and outputs one of them.

Selection means 24k receives the outputs RLPF, GLPF, BLPF from the low-pass filters 8r, 8g, 8b, and selects and outputs one of them. Selection means 24h also receives the outputs RLPF, GLPF, BLPF from the low-pass filters 8r, 8g, 8b, and selects and outputs one of them.

The selections made by the selection means 21, 23k, 23h, 24k, 24h are controlled by a control means 30.

When a pixel has the color component value of the h-th color (red, green, or blue) and its k-th color component value is calculated by interpolation, selection means 21 selects the two-dimensional memory storing the color component values of the h-th color and reads the color component value of the h-th color at the pixel to be interpolated (e.g., $h(i, j)$); selection means 23k selects the output kHPF of the high-pass filter of the k-th color; selection means 23h selects the output hHPF of the high-pass filter of the h-th color; selection means 24k selects the output kLPF of the low-pass filter of the k-th color; and selection means 24h selects the output hLPF of the low-pass filter of the h-th color.

Difference calculating means 25 calculates the difference between the k-th high-pass filtered signal kHPF and the h-th high-pass filtered signal hHPF (by subtracting the latter from the former) as a non-correlation value (kHPF−hHPF).

Difference calculating means 26 calculates the difference (kLPF−hLPF) between the k-th low-pass filtered signal kLPF and the h-th low-pass filtered signal hLPF by subtracting the latter from the former.

The low-pass filters 8r, 8g, 8b, selection means 24k and 24h, and difference calculating means 26 constitute a difference calculation means that calculates the difference between the low-frequency component of the pixel signal with the k-th spectral characteristic at a plurality of pixel positions in the neighborhood of the pixel to be interpolated and the low-frequency component of the pixel signal with the h-th spectral characteristic at a plurality of pixel positions in the neighborhood of the pixel to be interpolated.

Coefficient multiplying means 27 multiplies the output (kHPF−hHPF) of difference calculating means 25 by a predetermined constant q and outputs the product q(HPF−hHPF).

Coefficient multiplying means 28 multiplies the output (kLPF−hLPF) of difference calculating means 26 by a predetermined constant r and outputs the product r(LPF−hLPF).

The adding means 29 adds the pixel value h output from selection means 21, the value q(HPF−hHPF) output from coefficient multiplying means 27, and the value r(LPF−hLPF) output from coefficient multiplying means 28 and outputs their sum:

$$h+q(kHPF-hHPF)+r(kLPF-hLPF)$$

The output of the adding means 29 is used as the color component value (interpolated value) of the k-th color of the pixel being interpolated.

The high-pass filters 7r, 7g, 7b and selection means 23k, 23h constitute a varying component generation means that generates the varying component of the pixel signal with the k-th spectral characteristic at the plurality of pixel positions in the neighborhood of the pixel to be interpolated, and the varying component of the pixel signal with the h-th spectral characteristic at the plurality of pixel positions in the neighborhood of the pixel to be interpolated.

The low-pass filters 8r, 8g, 8b, and selection means 24k, 24h constitute a low-frequency component generation means that generates the low-frequency component of the pixel signal with the k-th spectral characteristic at the plurality of pixel positions in the neighborhood of the pixel to be interpolated, and the low-frequency component of the pixel signal with the h-th spectral characteristic at the plurality of pixel positions in the neighborhood of the pixel to be interpolated.

Selection means 21, the coefficient multiplying means 27, 28, and the adding means 29 constitute an interpolated value calculating means that calculates a pixel signal (interpolated value) of the k-th color at the pixel position to be interpolated, based on the pixel signal of the h-th color at the pixel position to be interpolated, the difference between the low-frequency components (kLPF−hLPF), and the non-correlation value (kHPF−hHPF). More particularly, the interpolated value calculating means calculates a product of the non-correlation value (kHPF−hHPF) calculated by difference calculating means 25 and a first predetermined coefficient (q), and a product of the difference calculated by difference calculating means 26 (kLPF−hLPF) and a second predetermined coefficient (r), and adds these products to the pixel signal of the color (the h-th color) at the pixel position to be interpolated, in order to calculate a pixel signal of another color (the k-th color) at the pixel position to be interpolated.

The interpolated value calculated by the interpolated value calculating means is stored in a two-dimensional memory (two-dimensional memory 6r, 6g, or 6b) for the pixel signal of the k-th color, for example. Alternatively, the value is output from an output terminal 11.

Next, the above interpolation method will be described in detail.

FIG. 4 shows the arrangement of green signals on the HV coordinate plane.

The green signals shown in the figure are obtained through green filters disposed on the image sensor 2. The blanks show positions where green signals are missing because the positions are covered by a filter of another color, i.e., a red or blue filter. Green signals must be interpolated at these positions.

Conventional interpolation methods include mean interpolation (bilinear interpolation), which uses a mean value of neighboring pixels. Unfortunately, this method lacks accuracy in areas of significant signal variation.

This embodiment provides a method of carrying out accurate interpolation in areas lacking similarity in the variation in color components of pixels neighboring the pixel to be interpolated, and carrying out optimal interpolation regardless of how the color component values vary. The interpolation calculation carried out by the calculating means 10 can be expressed by the following equation (1).

$$k(i, j) = h(i, j) + q\{kHPF(i, j) - hHPF(i, j)\} + r\{kLPF(i, j) - hLPF(i, j)\} \quad (1)$$

In equation (1), $k(i, j)$ represents a missing color signal at position $(i, j)$ on the image sensor 2, that is, a color signal to be interpolated, while $h(i, j)$ represents a color signal already existing at that position, that is, a signal having a known value. kHPF and hHPF are high-pass filtered values calculated by a predetermined computation from the k and h signals at pixel position $(i, j)$ and its neighboring pixel positions. kLPF and hLPF are low-pass filtered values calculated by a predetermined computation from the k and h signals at pixel position $(i, j)$ and its neighboring pixel positions.

The high-pass filtered values are a spatial high-frequency component of the true values estimated from the known pixel signals (image sensor output), while the low-pass filtered values are a spatial low-frequency component of these true values. The true values are the values of a spatially continuous pixel signal that would be obtained if the intervals between pixels on the image sensor were infinitesimally small and no photoelectric conversion error occurred.

Coefficients q and r are predetermined constants.

The meaning of the calculation expressed in the above equation (1) will be described with reference to FIGS. 13 to 16, which show the color signal levels and positions of pixels on the image sensor 2. For simplicity, only one row of the image sensor 2 and only one-dimensional calculations are illustrated. The band at the top shows the arrangement of color filters, where h represents an h pixel, k represents a k pixel, and the expressions in parentheses are coordinates indicating the pixel position. The black dots on curves a and b represent pixel signal values of the k and h signals obtained from the image sensor 2. Curves c and d represent low-pass filtered values of the k and h signals, while curves e and f represent high-pass filtered values of the k and h signals. A method of pixel interpolation of the k signal at pixel position $(i, j)$ will be described with reference to these drawings.

Figure 13:
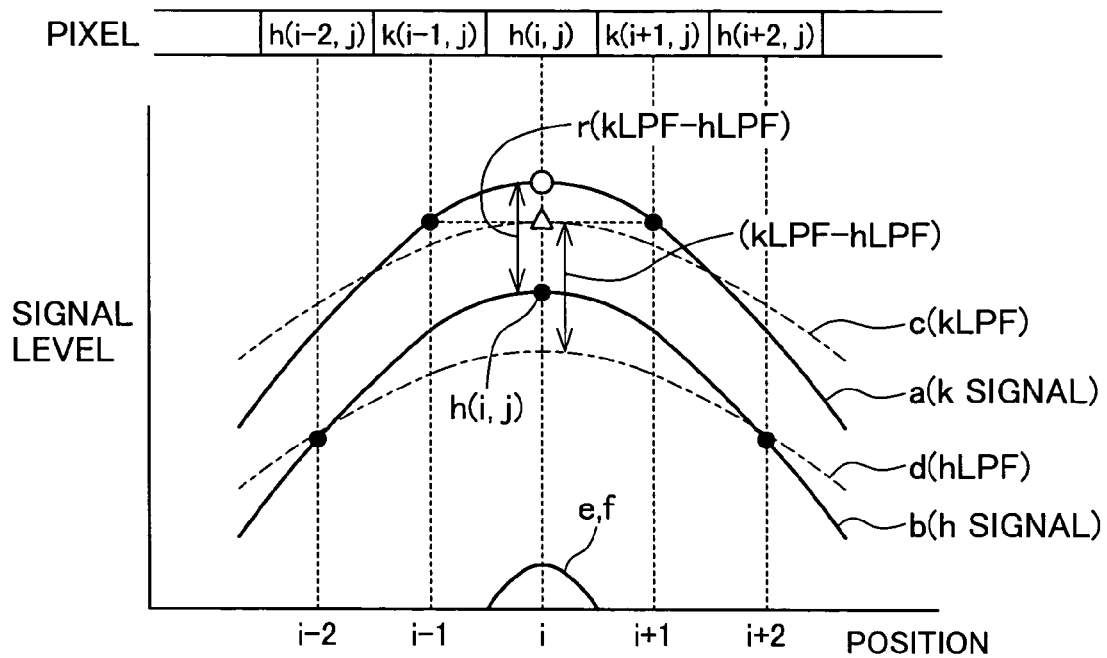
FIG. 13 schematically illustrates the principle of pixel interpolation in the first embodiment for a case of positive correlation between the k and h signals.
Figure 14:
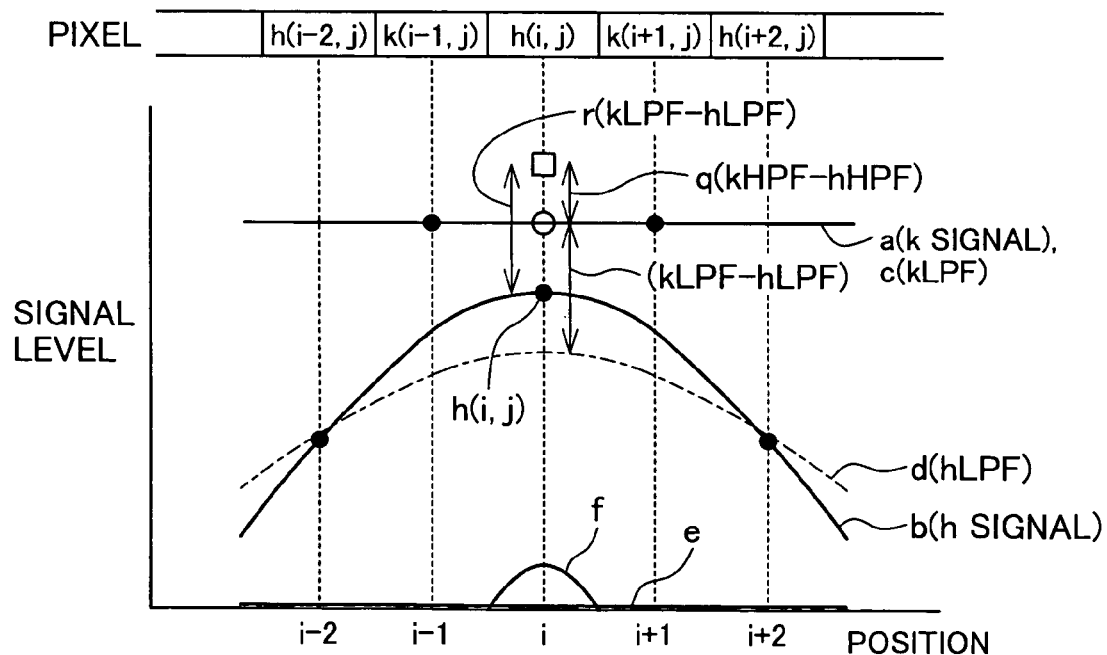
FIG. 14 schematically illustrates the principle of pixel interpolation in the first embodiment for a case of zero correlation between the k and h signals.
Figure 15:
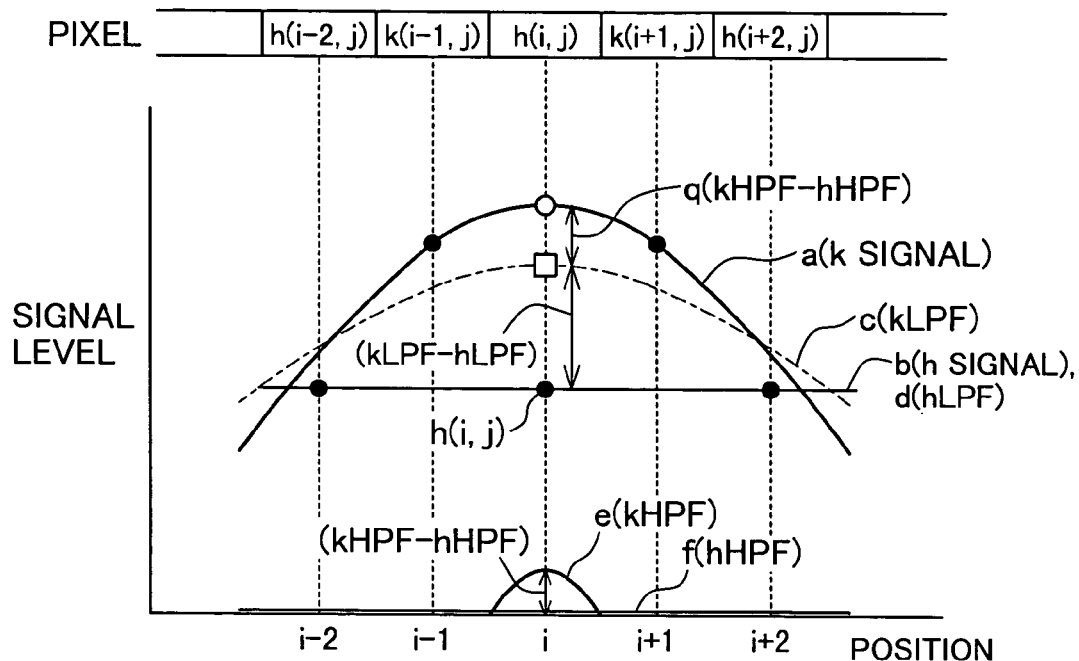
FIG. 15 schematically illustrates the principle of pixel interpolation in the first embodiment for another case of zero correlation between the k and h signals.
Figure 16:
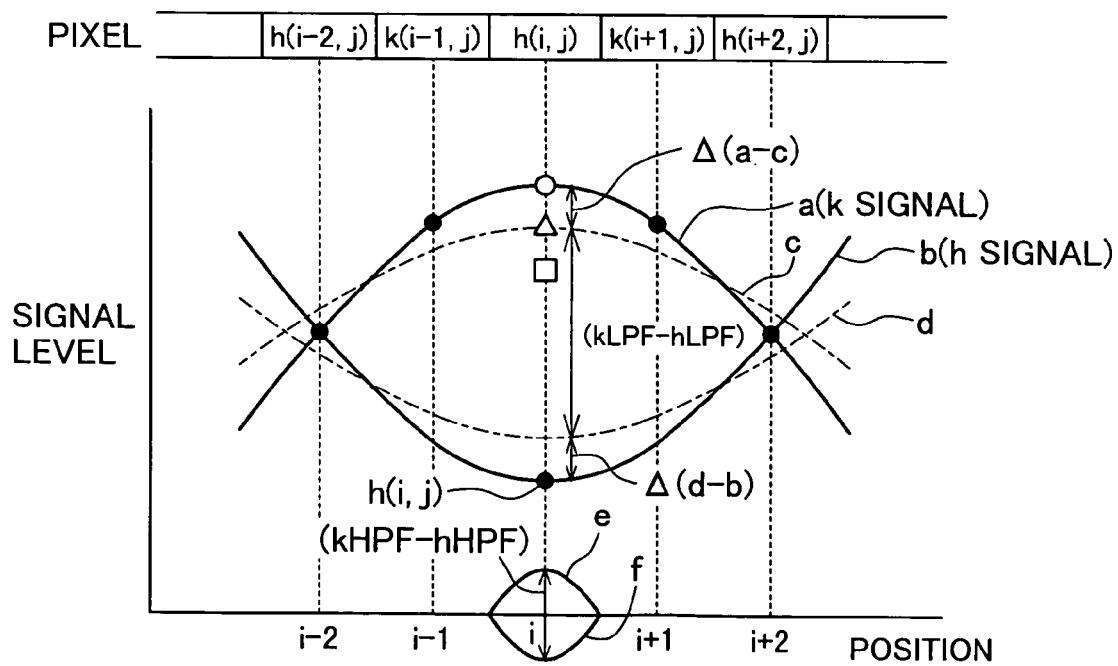
FIG. 16 schematically illustrates the principle of pixel interpolation in the first embodiment for a case of negative correlation between the k and h signals.

FIG. 13 shows a case of positive correlation, FIGS. 14 FIG. 15 show cases of non-correlation, and FIG. 16 shows a case of negative correlation between the k and h signals.

First, the case of positive correlation between the k and h signals will be described with reference to FIG. 13. The difference between curves c and d at pixel position $(i, j)$ is a value r(kLPF−hLPF) proportional to the difference in the low-frequency components (kLPF−hLPF). The difference between curves e and f at pixel position $(i, j)$ is the non-correlation value (kHPF−hHPF). If the h signal varies in the same way as the k signal, the high-pass filtered values represented by curves e and f are identical, so curves e and f mutually coincide and the non-correlation value (kHPF−hHPF) is zero (0).

In the conventional bilinear method, the mean of the k signals at pixel positions $(i-1, j)$ and $(i+1, j)$ is used as the k signal at pixel position $(i, j)$. The signal level interpolated by the bilinear method is indicated in FIG. 13 by the white triangle; interpolation error occurs as this level deviates from the true value that should be obtained.

In the interpolation method according to the first embodiment, the non-correlation value (kHPF−hHPF) multiplied by a coefficient q and the difference between low-frequency components (kLPF−hLPF) multiplied by a coefficient r are added to the known value $h(i, j)$ at pixel position $(i, j)$. When the k and h signals are correlated as shown in FIG. 13, the non-correlation value is substantially zero (0), so the interpolated signal $k(i, j)$ is the sum of the known value $h(i, j)$ at pixel position $(i, j)$ and the difference in low-frequency components (kLPF−hLPF) multiplied by the coefficient r. The white circle indicates the signal $k(i, j)$ interpolated in this way, which accurately reproduces the true value of the k signal. Accordingly, this embodiment can accurately interpolate pixels when there is significant correlation between the color signals.

Next, two cases of non-correlation between color signals will be described. FIGS. 14 and 15 show the color signal levels and the corresponding pixel positions on the image sensor 2. The k signals shown in FIGS. 14 and 15 are constant and there is no correlation between the k and h signals.

First, the example shown in FIG. 14 will be described. In this example, the high-pass filtered value kHPF of the k signal represented by curve e is zero (0) because there is no variation in the k signal. The interpolation method disclosed in Patent Document 1 (Japanese Patent Application Publication No. 2000-197512), which uses only correlation change, corresponds to adding a value proportional to (kLPF−hLPF) to the $h(i, j)$ signal.

The white rectangle in FIG. 14 represents the signal level interpolated according to this method; the deviation of this level from the true value is an interpolation error. The error occurs because there is no correlation between the k signal to be interpolated and the h signal used as a reference at pixel position $(i, j)$.

In the interpolation method according to the first embodiment, (kLPF−hLPF) multiplied by the coefficient r and (kHPF−hHPF) multiplied by the coefficient q are added to the known value $h(i, j)$ at pixel position $(i, j)$. As kHPF is zero (0), (kHPF−hHPF) has a negative value at pixel position $(i, j)$. The signal level interpolated according to the method of this embodiment is positioned at the white circle, accurately reproducing the true value of the k signal. In this embodiment, the degree of non-correlation between the variation in the k and h signals is calculated as a value (kHPF−hHPF). Therefore, (kHPF−hHPF) is referred to as a 'non-correlation value'. The degree of correlation is represented by the difference between the low-frequency components (kLPF−hLPF). As the degree of correlation increases, the difference approaches a constant value. Therefore, even when there is no correlation between signals, it is possible to interpolate pixels accurately by adding (kLPF−hLPF) and (kHPF−hHPF), multiplied respectively by the coefficients r and q, to h(i, j).

FIG. 15 shows an example in which the k signal varies while the h signal does not vary (opposite to the case in FIG. 14). Again, there is no correlation between the two color signals. The interpolation method disclosed in Patent Document 1 (Japanese Patent Application Publication No. 2000-197512), which uses only the color correlation change, corresponds to adding a signal level of (kLPF−hLPF) to the h(i, j) signal.

The white rectangle in FIG. 15 indicates the signal level interpolated according to this method. It can be seen that interpolation error occurs, because the signal level indicated by the white rectangle deviates from the true value of the k signal.

In the pixel interpolation method according to this embodiment, (kLPF−hLPF) multiplied by a coefficient r and (kHPF−hHPF) multiplied by a coefficient q are added to the h signal h(i, j) at pixel position (i, j). As kHPF is zero (0), (kHPF−hHPF) has a positive value at pixel position (i, j). The signal level interpolated by the method of this embodiment is positioned at the white circle, accurately reproducing the true value of the k signal. Therefore, even though there is no correlation between the signals shown in FIG. 15, this embodiment can interpolate pixels accurately by adding (kLPF−hLPF) and (kHPF−hHPF), multiplied respectively by the coefficients r and q, to h(i, j).

Whereas cases of non-correlation between the color signals were described in FIGS. 14 and 15, next a case of negative correlation will be described. FIG. 16 shows a case of negative correlation between the k and h signals. The sum of the difference Δ(a-c) between curve a and dot-dash line c and the difference Δ(d-b) between curves d and b equals a value q(kHPF−hHPF) proportional to the non-correlation value (kHPF−hHPF). The white triangle represents the signal level interpolated by the bilinear interpolation method; as in FIG. 13, there is interpolation error due to deviation from the true value. When there is negative correlation, the pixel interpolation method disclosed in Patent Document 1 (Japanese Patent Application Publication No. 2000-197512) above, which uses only correlation change of the colors, suffers from even greater interpolation error, as indicated by the white rectangle. The method of this embodiment achieves accurate pixel interpolation, as indicated by the white circle.

Pixels can be interpolated accurately as shown above regardless of whether there is a positive correlation, negative correlation, or no correlation between the color signals.

Pixel interpolations will now be described more specifically. The procedure followed by the calculating means 10 is shown in the flowchart in FIG. 17. As shown in the flowchart the interpolated value is calculated in the following six steps.
Step 1: Calculate green signal (GonR) at red pixel position.
Step 2: Calculate green signal (GonB) at blue pixel position.
Step 3: Calculate red signal (RonG) at green pixel position.
Step 4: Calculate blue signal (BonG) at green pixel position.
Step 5: Calculate blue signal (BonR) at red pixel position.
Step 6: Calculate red signal (RonB) at blue pixel position.
These steps can be generalized as:
Calculate k signal (k=R, G, or B) at
h pixel position (h=R, G, or B, h≠k)

Each of these six steps is carried out at every pixel position on the screen (in one frame).

When all six processing steps above have been completed, pixel signals are present for the missing colors at all pixel positions on the screen.

First, the calculation in step S1 will be described. Coordinate position (i, j) in FIG. 4, which lacks a green signal (the value is unknown) will be taken as an example. The low-pass filtered value GLPF of the green signal at this position can be calculated from the following equation (2).

$$GLPF(i, j) = \\ [\{G(i-3, j) + G(i-1, j) + G(i+1, j) + G(i+3, j)\}/4 + \\ \{G(i, j-3) + G(i, j-1) + G(i, j+1) + G(i, j+3)\}/4]/2 \quad (2)$$

The expressions within the parentheses in the signal notation indicate pixel coordinates.

The low-pass filtered value GLPF of the green signal at pixel position (i+1, j), where a green signal (G) already exists, is calculated from the following equation (3).

$$GLPF(i+1, j) = \\ [\{G(i-3, j)/8 + G(i-1, j)/4 + G(i+1, j)/4 + G(i+3, j)/4 + \\ G(i+5, j)/8\} + \{G(i+1, j-4)/8 + G(i+1, j-2)/4 + \\ G(i+1, j)/4 + G(i+1, j+2)/4 + G(i+1, j+4)/8\}]/2 \quad (3)$$

The low-pass filtered values of the green signals can be calculated by equations (2) and (3) because the green pixels are arrayed at equal repeating intervals. The low-pass filtered values of the green signals are calculated by low-pass filter 8g in FIG. 1 and input to the calculating means 10.

The high-pass filtered value GHPF of the green signal at pixel position (i, j), which lacks a green signal (G), is calculated from the following equation (4).

$$GHPF(i, j) = [\{-G(i-3, j) + G(i-1, j) + G(i+1, j) - \\ G(i+3, j)\} + (-G(i, j-3) + G(i, j-1) + \\ G(i, j+1) - G(i, j+3)\}]/2 \quad (4)$$

The high-pass filtered value GHPF of the green signal at pixel position (i+1, j), where a green signal (G) already exists, is calculated from the following equation (5).

$$GHPF(i+1, j) = [\{-G(i-3, j)/4 - G(i-1, j) + \\ 2.5G(i+1, j) - G(i+3, j) - G(i+5, j)/4\} + \\ \{-G(i+1, j-4)/4 - G(i+1, j-2) + \\ 2.5G(i+1, j) - G(i+1, j+2) - \\ G(i+1, j+4)/4\}]/2 \quad (5)$$

The high-pass filtered values of the green signals can be calculated by equations (4) and (5) because the green pixels are arrayed at equal repeating intervals. The high-pass filtered values of the green signals are calculated by high-pass filter 7g in FIG. 1 and input to the calculating means 10.

The low-pass and high-pass filtered values of the red signals can be calculated from the following equations. For the j-th row, in which no pixel has a red signal, the value is calculated from the rows above and below. The low-pass filtered value RLPF of the red signal at pixel position (i, j) is calculated from equation (6).

$$RLPF(i, j) = [[\{R(i-3, j-1) + R(i-3, j+1)\}/2 + \\ \{R(i-1, j-1) + R(i-1, j+1)\}/2 + \\ \{R(i+1, j-1) + R(i+1, j+1)\}/2 + \\ \{R(i+3, j-1) + R(i+3, j+1)\}/2]/4 + \\ [\{R(i-1, j-3) + R(i+1, j-3)\}/2 + \\ \{R(i-1, j-1) + R(i+1, j-1)\}/2 + \\ \{R(i-1, j+1) + R(i+1, j+1)\}/2 + \\ \{R(i-1, j+3) + R(i+1, j+3)\}/2]/4]/2 \quad (6)$$

The low-pass filtered value RLPF of the red signal at position (i+1, j) is calculated from the following equation (7).

$$RLPF(i+1, j) = [[\{R(i-1, j-1) + R(i-1, j+1)\}/2 + \\ \{R(i+1, j-1) + R(i+1, j+1)\}/2 + \\ \{R(i+3, j-1) + R(i+3, j+1)\}/2]/3 + \\ \{R(i+1, j-3) + R(i+1, j-1) + \\ [\{R(i-1, j-3) + R(i+1, j-3)\}/2 \quad (7)$$

Turning to the rows which already have red signals, the low-pass filtered value RLPF of the red signal at pixel position (i, j+1) in row (j+1) is calculated from the following equation (8).

$$RLPF(i, j+1) = [\{R(i-3, j+1) + R(i-1, j+1) + \\ \{R(i+1, j+1) + R(i+3, j+1)\}/4 + \\ \{R(i-1, j-1) + R(i+1, j-1)\}/2 + \\ \{R(i-1, j+1) + R(i+1, j+1)\}/2 + \\ [\{R(i-1, j-3) + R(i+1, j+3)\}/2]/3]/2 \quad (8)$$

In another row which already has red signals, the low-pass filtered value RLPF of the red signal at pixel position (i+1, j+1) in row (j-1) is calculated from the following equation (9).

$$RLPF(i+1, j+1) = [[R(i-3, j+1)/8 + R(i-1, j+1)/4 + \\ R(i+1, j+1)/4 + R(i+3, j+1)/4 + \\ R(i+5, j+1)/8 + R(i+1, j-3)/8 + \\ R(i+1, j-1)/4 + R(i+1, j+1)/4 + \\ R(i+1, j+3)/4 + R(i+1, j+5)/8]/2 \quad (9)$$

The low-pass filtered values of the red signals can be calculated by equations (6) to (9) because the array of red pixels repeats the pattern of (i, j), (i+1, j), (i, j+1) and (i+1, j+1). The low-pass filtered values of the red signals are calculated by low-pass filter 8r in FIG. 1 and input to the calculating means 10.

The high-pass filtered value RHPF of the red signal at position (i, j) is calculated from equation (10).

$$RHPF(i, j) = [-\{R(i-3, j-1) + R(1-3, j+1)\}/2 + \\ \{R(i-1, j-1) + R(i-1, j+1)\}/2 + \\ \{R(1+1, j-1) + R(i+1, j+1)\}/2 - \\ \{R(i+3, j-1) + R(i+3, j+1)\}/2 - \\ \{R(i-1, j-3) + R(i+1, j-3)\}/2 + \\ \{R(i-1, j-1) + R(i+1, j-1)\}/2 + \\ \{R(i-1, j+1) + R(i+1, j+1)\}/2 - \\ \{R(i-1, j+3) + R(i+1, j+3)\}/2]/2 \quad (10)$$

The high-pass filtered value RHPF of the red signal at position (i+1, j) is calculated from equation (11).

$$RHPF(i+1, j) = \left[ -R\left\{ \begin{matrix} (i-3, j-1) + \\ R(i-3, j+1) \end{matrix} \right\}/2/4 - \right. \\ \left\{ \begin{matrix} R(i-1, j-1) + \\ R(i-1, j+1) \end{matrix} \right\}/2 + 2.5 \\ \left\{ \begin{matrix} R(i+1, j-1) \\ R(i+1, j+1) \end{matrix} \right\}/2 - \\ \left\{ \begin{matrix} R(i+3, j-1) + \\ R(i+3, j+1) \end{matrix} \right\}/2 - \\ \left\{ \begin{matrix} R(i+5, j-1) + \\ R(i+5, j+1) \end{matrix} \right\}/2/4 \right] + \\ \left[ \begin{matrix} -R(i+1, j-3) + & R(i+1, j+1) - \\ R(i+1, j-1) & R(i+1, j+3) \end{matrix} \right]/2 \quad (11)$$

Coming to the rows which already have red signals, the high-pass filtered value RHPF of the red signal at pixel position (i, j+1) in row (j+1) is calculated from the following equation (12).

$$RHPF(i, j+1) = [-\{R(i-3, j+1) + R(i-1, j+1) + \\ R(i+1, j+1) - R(i+3, j+1)\} + [-\{R(i-1, j-3) + \\ R(i+1, j-3)\}/2/4 - \{R(i-1, j-1) + \\ R(i+1, j-1)\}/2 + 2.5\{R(i-1, j+1) + \\ R(i+1, j+1)\}/2 - \{R(i-1, j+3) + R(i+1, j+3)\}/2 - \\ \{R(i-1, j+5) + R(i+1, j+5)\}/2/4]/2$$ (12)

In another row which already has red signals, the high-pass filtered value RHPF of the red signal at pixel position (i+1, j+1) in row (j−1) is calculated from the following equation (13).

$$RHPF(i+1, j+1) = [\{-R(i-3, j+1)/4 - \\ R(i-1, j+1) + \\ 2.5R(i+1, j+1) - \\ \left. \begin{array}{l} R(i+3, j+1) - \\ R(i+5, j+1)/4 \end{array} \right\} + \\ \left\{ \begin{array}{l} -R(i+1, j-1) + \\ 2.5R(i+1, j+1) - \end{array} \right. \\ R(i+1, j+3) - \\ R(i+1, j+5)/4\}]/2$$ (13)

The high-pass filtered values of the red signals can be calculated by equations (10) to (13) because the array of red pixels repeats the pattern of (i, j), (i+1, j), (i, j+1) and (i+1, j+1). The high-pass filtered values of the red signals are calculated by high-pass filter 7r in FIG. 1 and input to the calculating means 10.

Coming finally to the low-pass and high-pass filtered values of the blue signals, the blue pixels are arrayed in the same manner as the red pixels; only the coordinate values are different. Therefore, to calculate these values, the equations (6) to (13) that were used to calculate the low-pass and high-pass filtered values of the red signals can be used by changing coordinate values. A detailed description will be omitted. The high-pass filtered values of the blue signals are calculated by high-pass filter 7b in FIG. 1 and input to the calculating means 10.

The equations used above to calculate the low-pass and high-pass filtered values used in equation (1) are shown for illustrative purposes only. The number of pixels and the coefficients used in the equations can be changed according to the size or resolution of the image.

The low-pass and high-pass filtered values of the red, green, and blue signals at all pixel positions in the image are obtained from equations (2) to (13) above. In step S1, the green signals missing at red pixel positions are calculated. The green signal at a red pixel position is calculated from the following equation (14), which conforms to equation (1). The coordinate values differ from equation (1) because red pixels are present at positions (i+n, j+m), where m and n are odd integers.

$$G(i+n, j+m) = \{R(i+n, j+m) + q(GHPF(i+n, j+m) - \\ RHPF(i+n, j+m))\} + r(GLPF(i+n, j+m) - \\ RLPF(i+n, j+m))$$ (14)

GHPF, GLPF, RHPF, and RLPF in equation (14) are the high-pass and low-pass filtered values calculated in equations (2) to (13) above. The values of coefficients q and r may be determined in advance to ensure optimal image interpolation. Values of q=0.25 and r=1, for example, yield good pixel interpolation results, although the coefficients are not limited to these values. FIG. 18 shows the two-dimensional positions of the green signals gr obtained at red pixel positions by interpolation according to equation (14).

Next comes the calculation process in step S2. In step S2, green signals missing at blue pixel positions are interpolated. The green signal at a blue pixel position is calculated from the following equation (15), which conforms to equation (1). The coordinate values differ from equation (1) because blue pixels are present at positions (i+s, j+t), where s and t are even integers.

$$G(i+s, j+t) = \{B(i+s, j+t) + q(GHPF(i+s, j+t) - \\ BHPF(i+s, j+t))\} + r(GLPF(i+s, j+t) - \\ BLPF(i+s, j+t))$$ (15)

FIG. 19 shows the two-dimensional positions of the green signals gb obtained at blue pixel positions by interpolation according to equation (15). FIG. 19 also shows the interpolated signals gr obtained from equation (14). Green signals are obtained for all the pixel positions by interpolation of the green signals at red pixel positions according to equation (14) and at blue pixel positions according to equation (15).

Next comes the calculation process in step S3. In step S3, red signals missing at green pixel positions are interpolated. The red signal at a green pixel position is calculated from the following equations (16) and (17), which conform to equation (1). The coordinate values differ from equation (1) because green pixels are present at positions (i+s, j+m), where s is an even integer and m is an odd integer, and at positions (i+n, j+t), where n is an odd integer and t is an even integer.

$$G(i+s, j+m) = \{R(i+s, j+m) + q(RHPF(i+s, j+m) - \\ GHPF(i+s, j+m))\} + r(RLPF(i+s, j+m) - \\ GLPF(i+s, j+m))$$ (16)

-continued $$R(i+n, j+t) = \{R(i+n, j+t) + q(RHPF(i+n, j+t) - \quad (17)$$
$$GHPF(i+n, j+t))\} + r(RLPF(i+n, j+t) -$$
$$GLPF(i+n, j+t))$$

FIG. 20 shows the two-dimensional positions of the red signals rg obtained at green pixel positions by interpolation according to equations (16) and (17).

RLPF, RHPF, GLPF, and GHPF in equations (16) and (17) are the output values of the low-pass and high-pass filters as shown in equations (2) to (13) above, but GLPF and GHPF may be recalculated using the interpolated gr and gb values calculated in steps S1 and S2. In that case, the interpolated gr and gb values calculated by the calculating means 10 are output to two-dimensional memory 6g as shown in FIG. 1 and stored temporarily therein, and the calculations carried out in high-pass filter 7g and low-pass filter 8g are repeated.

Next comes the calculation process in step S4. In this step, blue signals missing at green pixel positions are interpolated. The blue signal at a green pixel position is calculated from the following equations (18) and (19), which conform to equation (1). The coordinate values differ from equation (1) because green pixels are present at positions (i+s, j+m), where s is an even integer and m is an odd integer, and positions (i+n, j+t), where n is an odd integer and t is an even integer.

$$B(i+s, j+m) = \{G(i+s, j+m) + q(BHPF(i+s, j+m) - \quad (18)$$
$$GHPF(i+s, j+m))\} + r(BLPF(i+s, j+m) -$$
$$GLPF(i+s, j+m))$$

$$B(i+n, j+t) = \{G(i+n, j+t) + q(BHPF(i+n, j+t) - \quad (19)$$
$$GHPF(i+n, j+t))\} + r(BLPF(i+n, j+t) -$$
$$GLPF(i+n, j+t))$$

FIG. 21 shows the two-dimensional positions of the blue signals bg obtained at green pixel positions by interpolation according to equations (18) and (19).

As above, BLPF, BHPF, GLPF, and GHPF in equations (18) and (19) are the output values of the low-pass and high-pass filters, but GLPF and GHPF may be recalculated using the interpolated gr and gb values calculated in steps S1 and S2.

Next comes the calculation process in step S5. In this step, red signals missing at blue pixel positions are interpolated. The red signal at a blue pixel position is calculated from the following equation (20), which conforms to equation (1). The coordinate values differ from equation (1) because blue pixels are present at positions (i+s, j+t), where s and t are even integers.

$$R(i+s, j+t) = \{G(i+s, j+t) + q(RHPF(i+s, j+t) - \quad (20)$$
$$GHPF(i+s, j+t))\} + r(RLPF(i+s, j+t) -$$
$$GLPF(i+s, j+t))$$

FIG. 22 shows the two-dimensional positions of the red signals rb obtained at blue pixel positions by interpolation according to equation (20). FIG. 22 also shows the red signals rg obtained at green pixel positions by interpolation according to equations (16) and (17). As a result of interpolation according to equations (16), (17), and (20), red signals are obtained for all the pixels.

As above, RLPF, RHPF, GLPF, and GHPF in equation (20) are the output values of the low-pass and high-pass filters, but GLPF and GHPF may be recalculated using the interpolated gr and gb values calculated in steps S1 and S2. RLPF and RHPF may also be recalculated using the interpolated rg values calculated in step S3.

Next comes the calculation process in step S6. In this step, blue signals missing at red pixel positions are interpolated. The blue signal at a red pixel position is calculated from the following equation (21), which conforms to equation (1). The coordinate values differ from equation (1) because red pixels are present at positions (i+n, j+m), where n and m are odd integers.

$$B(i+n, j+m) = \{G(i+n, j+m) + q(BHPF(i+n, j+m) - \quad (21)$$
$$GHPF(i+n, j+m))\} + r(BLPF(i+n, j+m) -$$
$$GLPF(i+n, j+m))$$

FIG. 23 shows the two-dimensional positions of the blue signals br obtained at red pixel positions by interpolation according to equation (21). FIG. 23 also shows the blue signals bg obtained at green pixel positions by interpolation according to equations (18) and (19). As a result of interpolation according to equations (18), (19), (21), blue signals are obtained for all the pixels.

As above, BLPF, BHPF, GLPF, and GHPF in equation (21) are the output values of the low-pass and high-pass filters, but GLPF and GHPF may be recalculated using the interpolated gr and gb values calculated in steps S1 and S2. BLPF and BHPF may also be recalculated using the interpolated bg values calculated in step S4.

From the calculations in steps S1 to S6 above, the color signals missing at each pixel can be interpolated and red, green, blue signals can be obtained for all the pixels.

SECOND EMBODIMENT

Figure 24:
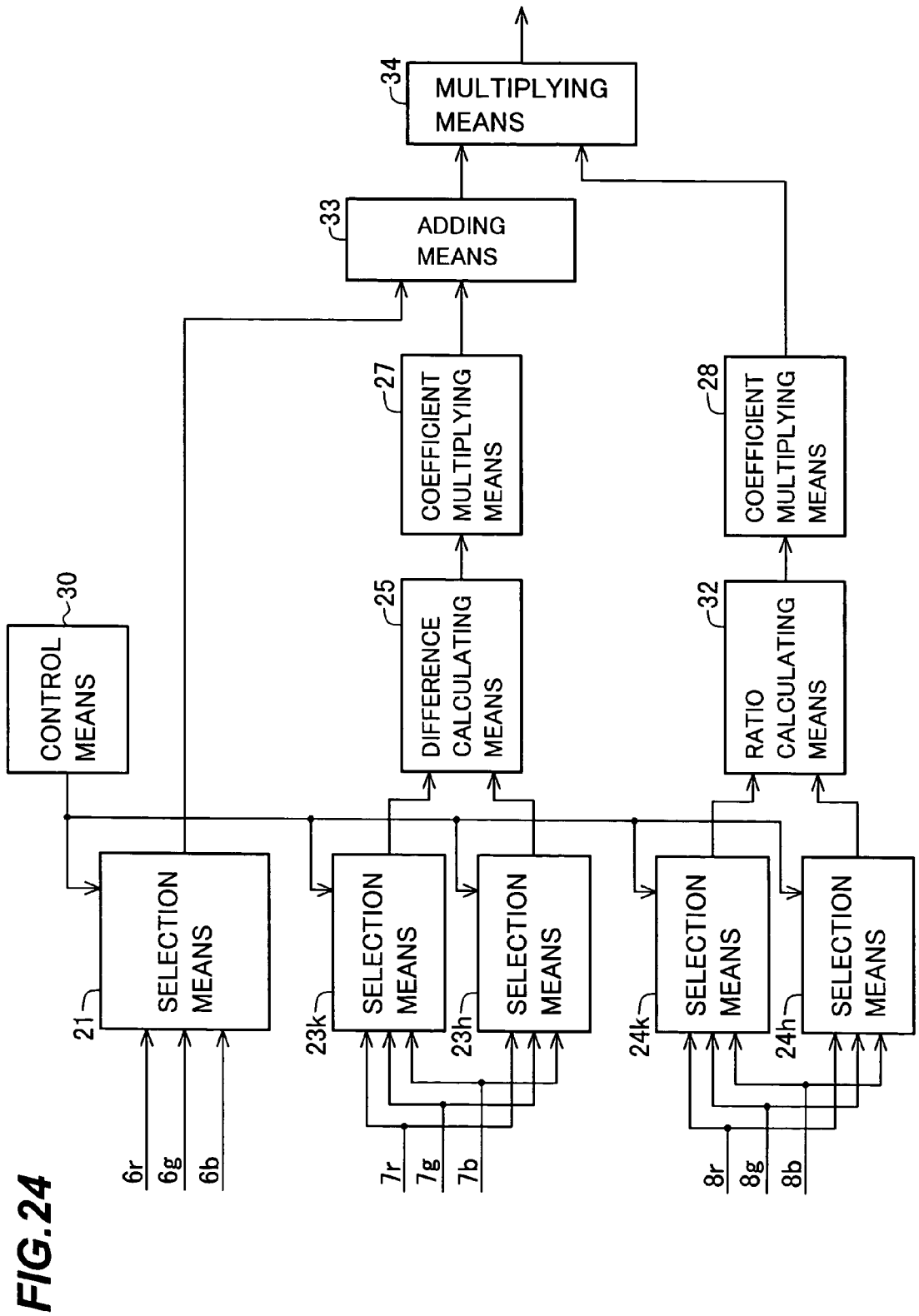
FIG. 24 is a block diagram showing the structure of the calculating means in the second embodiment.

Next, image signal processing apparatus according to a second embodiment will be described. The overall structure of an imaging device equipped with the image signal processing device according to the second embodiment is as shown in FIG. 1, but the internal structure of the calculating means 10 is different. FIG. 24 shows the structure of the calculating means according to the second embodiment. The calculating means shown in FIG. 24 is similar to that shown in FIG. 12, except that it has a ratio calculating means 32 instead of difference calculating means 26 in FIG. 12, and a combination of an adding means 33 and a multiplying means 34 instead of the adding means 29.

The ratio calculating means 32 calculates the ratio kLPF/hLPF between the outputs from selection means 24k and 24h.

In the second embodiment, the low-pass filters 8r, 8g, 8b, selection means 24k and 24h, and ratio calculating means 32 constitute a ratio calculation means that calculates the ratio between the low-frequency component of the pixel signal with the k-th spectral characteristic at a plurality of pixel positions in a neighborhood of the pixel to be interpolated and the low-frequency component of the pixel signal with the h-th spectral characteristic at those pixel positions.

The coefficient multiplying means 28 multiplies the output kLPF/hLPF of the ratio calculating means 32 by a predetermined coefficient r, and outputs the product r(kLPF/hLPF).

The adding means 33 adds the pixel value h output from selection means 21 and the value q(kHPF−hHPF) output from coefficient multiplying means 27, and outputs the sum h+q (kHPF−hHPF).

The multiplying means 34 multiplies the output h+q (kHPF−hHPF) of the adding means 33 by the output r(kLPF/hLPF) of coefficient multiplying means 28, and outputs the product {h+q(kHPF−hHPF)}×r(kLPF−hLPF).

The output from the multiplying means 34 is used as the color component value (interpolated value) of the k-th color of the pixel to be interpolated.

The selection means 21, coefficient multiplying means 27, 28, adding means 33, and multiplying means 34 constitute an interpolated value calculating means which calculates the pixel signal (interpolated value) of the k-th color at the pixel position to be interpolated, based on the pixel signal of the h-th color, the ratio of the low-frequency components (kLPF/hLPF), and the non-correlation value (kHPF−hHPF) at that position. More particularly, the interpolated value calculating means adds a pixel signal of one color (the h-th color) at the pixel position to be interpolated to the product of the non-correlation value (kHPF−hHPF) calculated by the difference calculating means 25 and a first predetermined coefficient (q), and multiplies the sum by the product of the ratio of low-frequency components (kLPF/hLPF) calculated by the ratio calculating means 32 and a second predetermined coefficient (r) to calculate a pixel signal of another color (the k-th color) at the pixel position to be interpolated.

The interpolated value calculated by the interpolated value calculating means is stored in the two-dimensional memory (6r, 6g, or 6b) for the pixel signal of the k-th color. Alternatively, the value is output from the output terminal 11.

The above interpolation calculation performed by the calculating means 10 is expressed by the following equation (22).

$$k(i, j) = [h(i, j) + q\{kHPF(i, j) - hHPF(i, j)\}] \times r\{kLPF(i, j)/hLPF(i, j)\} \quad (22)$$

In equation (22), as in equation (1), k(i,j) is a missing color signal at position (i, j) on the image sensor 2, that is, a color signal to be interpolated; h(i, j) is a color signal already present at position (i, j). kHPF and hHPF are high-pass filtered values calculated by predetermined methods from the k and h signals of pixels in the neighborhood of position (i, j). kLPF and hLPF are low-pass filtered values calculated by predetermined methods from the k and h signals of pixels in the same neighborhood. Coefficients q and r are predetermined constants.

The meaning of the calculation shown in equation (22) will be described with reference to FIGS. 25 to 28, which show the signal levels and positions of pixels on the image sensor 2. For simplicity, only one row of the image sensor 2 and only one-dimensional calculations are illustrated. The band at the top shows the arrangement of color filters, where h represents an h pixel, k represents a k pixel, and the expressions in parentheses are coordinates indicating pixel positions. Curve a represents true values of the k signal, while the curve b represents true values of the h signal. The black dots on curves a and b represent pixel signal values of the k and h signals which are output from the image sensor 2. Curves c and d represent low-pass filtered values of the k and h signals, while curves e and f represent high-pass filtered values of the k and h signals. A method of pixel interpolation of the k signal at pixel position (i, j) will be described with reference to these drawings.

Figure 25:
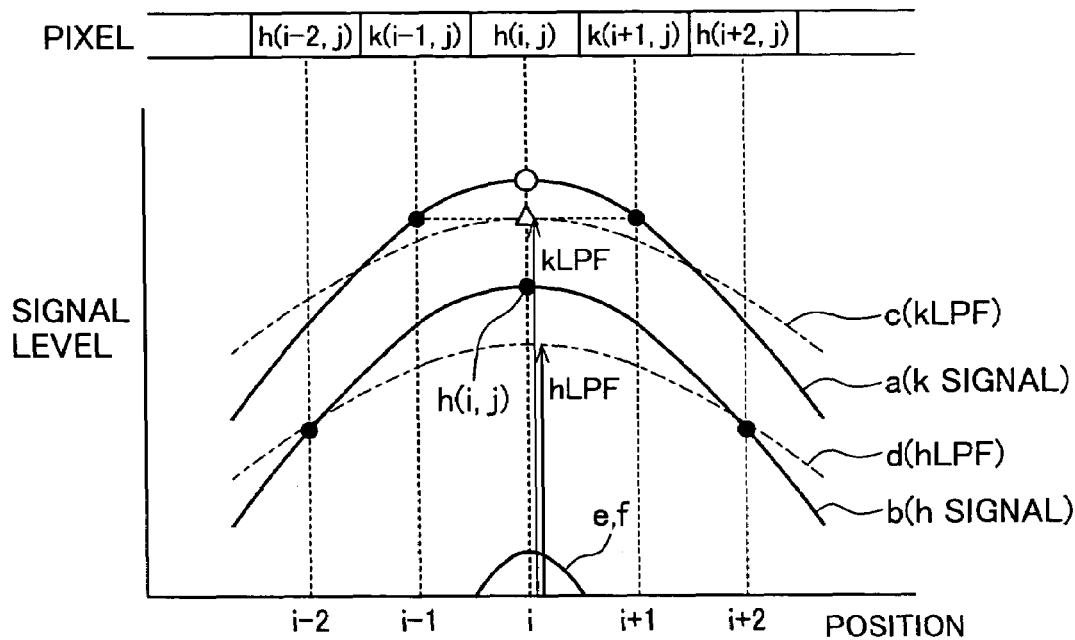
FIG. 25 schematically illustrates the principle of pixel interpolation in the second embodiment for a case of positive correlation between the k and h signals.
Figure 26:
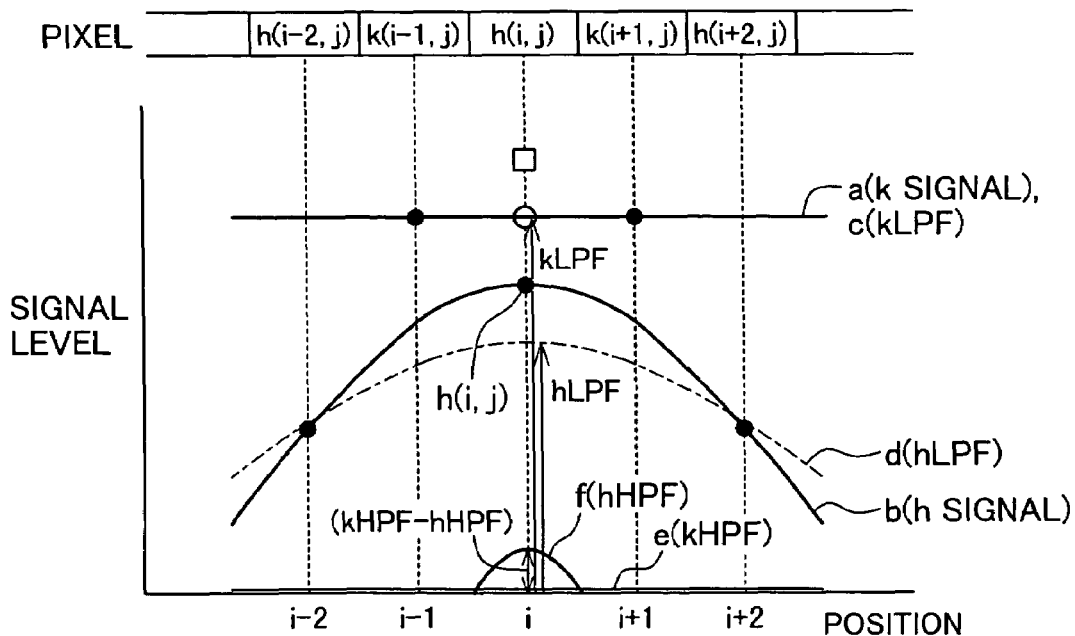
FIG. 26 schematically illustrates the principle of pixel interpolation in the second embodiment for a case of zero correlation between the k and h signals.
Figure 27:
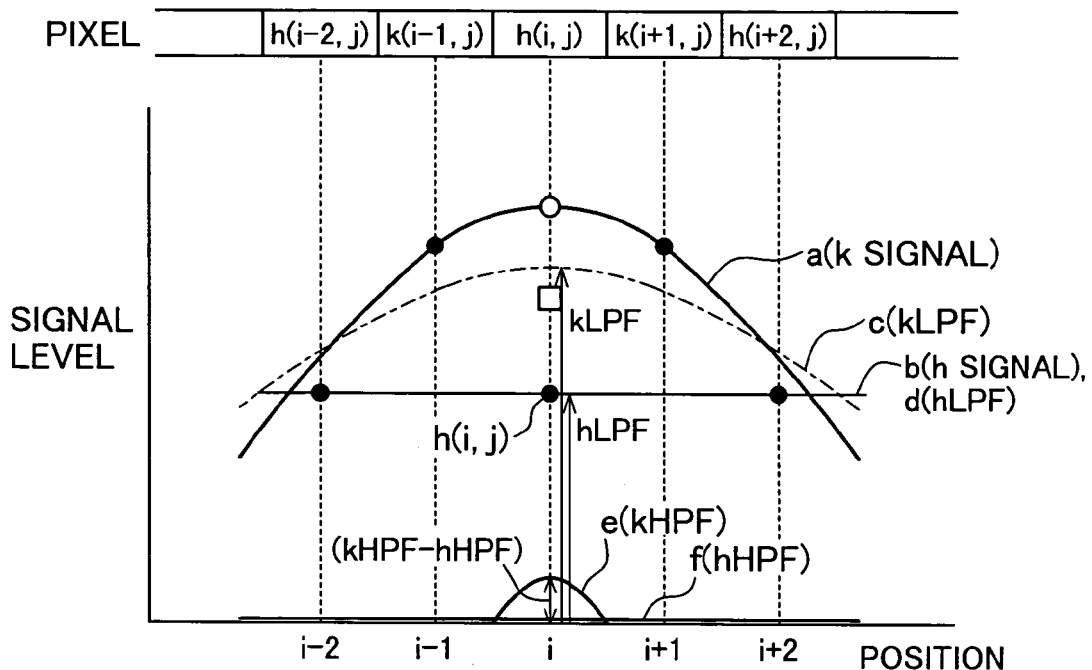
FIG. 27 schematically illustrates the principle of pixel interpolation in the second embodiment for another case of zero correlation between the k and h signals.
Figure 28:
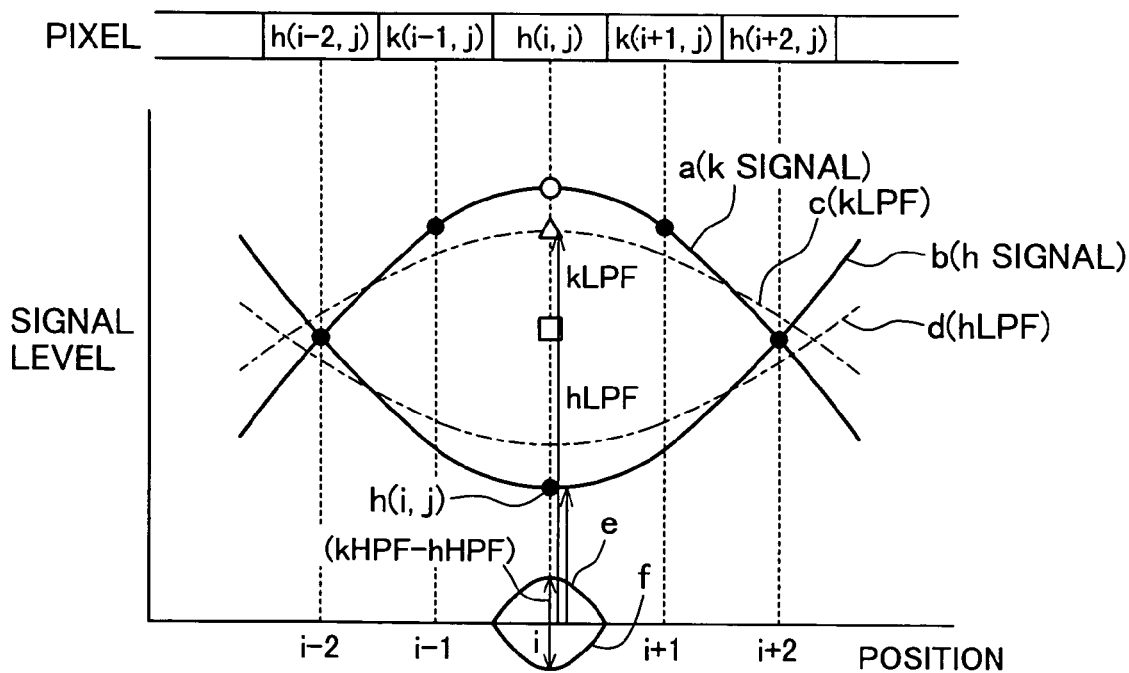
FIG. 28 schematically illustrates the principle of pixel interpolation in the second embodiment for a case of negative correlation between the k and h signals.

FIG. 25 shows a case of positive correlation, FIGS. 26 and 27 show cases of non-correlation, and FIG. 28 shows a case of negative correlation between the k and h signals.

First, the case of positive correlation between the k and h signals will be described with reference to FIG. 25. If the h signal varies in the same way as the k signal, the high-pass filtered values represented by curves e and f are identical, so curves e and f coincide as shown.

In the conventional bilinear method, the mean of the k signals at pixel positions (i−1, j) and (i+1,j) is used as the k signal at pixel position (i, j). The white triangle in FIG. 25 represents the signal level interpolated by the bilinear method; interpolation error occurs as this level deviates from the true value that should be obtained.

In the interpolation method according to the second embodiment, the non-correlation value (kHPF−hHPF) is multiplied by a coefficient q, then added to the known value h(i, j) at position (i, j), and the sum is multiplied by the product of the ratio kLPF/hLPF and a coefficient r to obtain the interpolated signal k(i, j). kLPF/hLPF is a ratio of low-pass filtered values. As the degree of correlation increases, this ratio approaches unity (1).

As might have been mentioned in the description of the first embodiment, there is a strong correlation between the signal variations in localized areas of an image. Therefore, the low-pass filtered values, which indicate gradual variations in the signals, are related to the signal values by the following equation (23).

$$k(i, j):h(i, j)=kLPF(i, j):hLPF(i, j) \quad (23)$$

From equation (23), the signal k(i, j) at an h pixel position (i, j) can be expressed by the following equation (24).

$$k(i,j)=h(i, j) \times kLPF(i, j)/hLPF(i, j) \quad (24)$$

Equation (24) rests on the assumption of strongly correlated signal variations in a localized image area. This assumption is true for most areas in an image. Highly accurate pixel interpolation is possible in areas with a strong positive correlation between signal variations. In areas having no correlation, such as at edges, or in areas having negative correlation, pixel interpolation error may occur as described in the first embodiment.

In FIG. 25, the ratio of curves c and d at pixel position (i, j) is kLPF/hLPF, while the difference between curves e and f at that position is (kHPF−hHPF). In the interpolation method according to the second embodiment, the product of (kHPF−hHPF) and the coefficient q is added to the known value h(i, j) at pixel position (i, j); then the sum is multiplied by the product of kLPF/hLPF and the coefficient r. The white circle in FIG. 25 shows the interpolated signal k(i, j) calculated by this method using equation (22). The interpolated value accurately reproduces the true value. As shown in FIG. 25, when the k signal varies in the same way as the h signal, (kHPF−hHPF) approaches zero (0), so the interpolated signal is in effect calculated by multiplication by a value proportional to the ratio between the signal variations obtained by the low-pass filters. This method can accurately interpolate pixels when the color signals are highly correlated.

Next, cases of non-correlation will be described. At edges in an image, for example, the correlation between colors is reduced, so interpolation error may result if the interpolated value is calculated by equation (24). This problem can be solved by taking the reduced correlation at edges into consideration and inserting the difference in high-pass filtered signals (kHPF–hHPF) into equation (24), so that interpolation is carried out according to equation (22). In equation (22), although (kHPF(i, j)–hHPF(i, j)) is a difference between signal components at edges in an image, the difference will be zero (0) at edges at which there is a strong correlation between the k and h signals, so if r=1, equation (22) reduces to equation (24). If there is no correlation between colors, (kHPF(i, j)–hHPF(i, j) relates to the specific value of each color signal, so accurate pixel interpolation can be achieved for each color.

FIGS. 26 and 27 show signal levels and positions of pixels on the image sensor 2. There is no correlation between the k and h signals in FIGS. 26 and 27.

First, the example shown in FIG. 26 will be described. In this example, the k signal is unvarying, so the high-pass filtered value kHPF of the k signal represented by curve e is zero (0).

If interpolation is carried out by using only the change in color correlation as in equation (24), the interpolated pixel signal level is at the position of the white rectangle, because although the k signal to be interpolated at pixel position (i, j) does not vary, the interpolation is referenced to the h signal, which does vary, causing interpolation error. The degree of non-correlation between the k and h signals can be calculated by (kHPF–hHPF). The product of the value (kHPF–hHPF) and the coefficient q is therefore added to the value of h(i, j), and the sum is multiplied by r(kLPF/hLPF). In the case shown in FIG. 26, kHPF is zero (0) and (kHPF–hHPF) has a negative value at pixel position (i, j), so a negative value is added to h(i, j). The white circle represents the pixel interpolated according to equation (22) in this embodiment. The interpolated value accurately reproduces the true value. The second embodiment can provide accurate pixel interpolation even when there is no correlation between signals.

FIG. 27 shows another example in which there is no correlation between the color signals; in this case, the k signal varies but the h signal does not vary. If interpolation is carried out by using only the color correlation change as in equation (24), the h(i, j) signal is multiplied by the product of the signal level ratio kLPF/hLPF and the coefficient r. The white rectangle in FIG. 27 represents the signal level thus interpolated, which deviates from the true value due to interpolation error.

In the pixel interpolation method according to the second embodiment, the product of (kHPF–hHPF) and the coefficient q is added to the h signal at pixel position (i, j), and the sum is multiplied by r(kLPF/hLPF). In FIG. 27, hHPF is zero (0) and (kHPF–hHPF) has a positive value at pixel position (i, j). The white circle represents the signal level interpolated according to this embodiment, which accurately reproduces the true value of the k signal.

Cases of non-correlation between color signals having been described with reference to FIGS. 26 and 27, next a case of negative correlation will be described. FIG. 28 shows a case of negative correlation between the k and h signals. The white triangle represents the signal level interpolated by the bilinear interpolation method; as in FIG. 25, there is interpolation error due to deviation from the true value. In cases of negative correlation, pixel interpolation using only color correlation change according to equation (24) suffers from even greater interpolation error, as indicated by the white rectangle. The method of this embodiment achieves accurate pixel interpolation, as indicated by the white circle.

Pixels can be interpolated accurately as shown above regardless of whether there is a positive correlation, negative correlation, or no correlation between the color signals.

Figure 17:
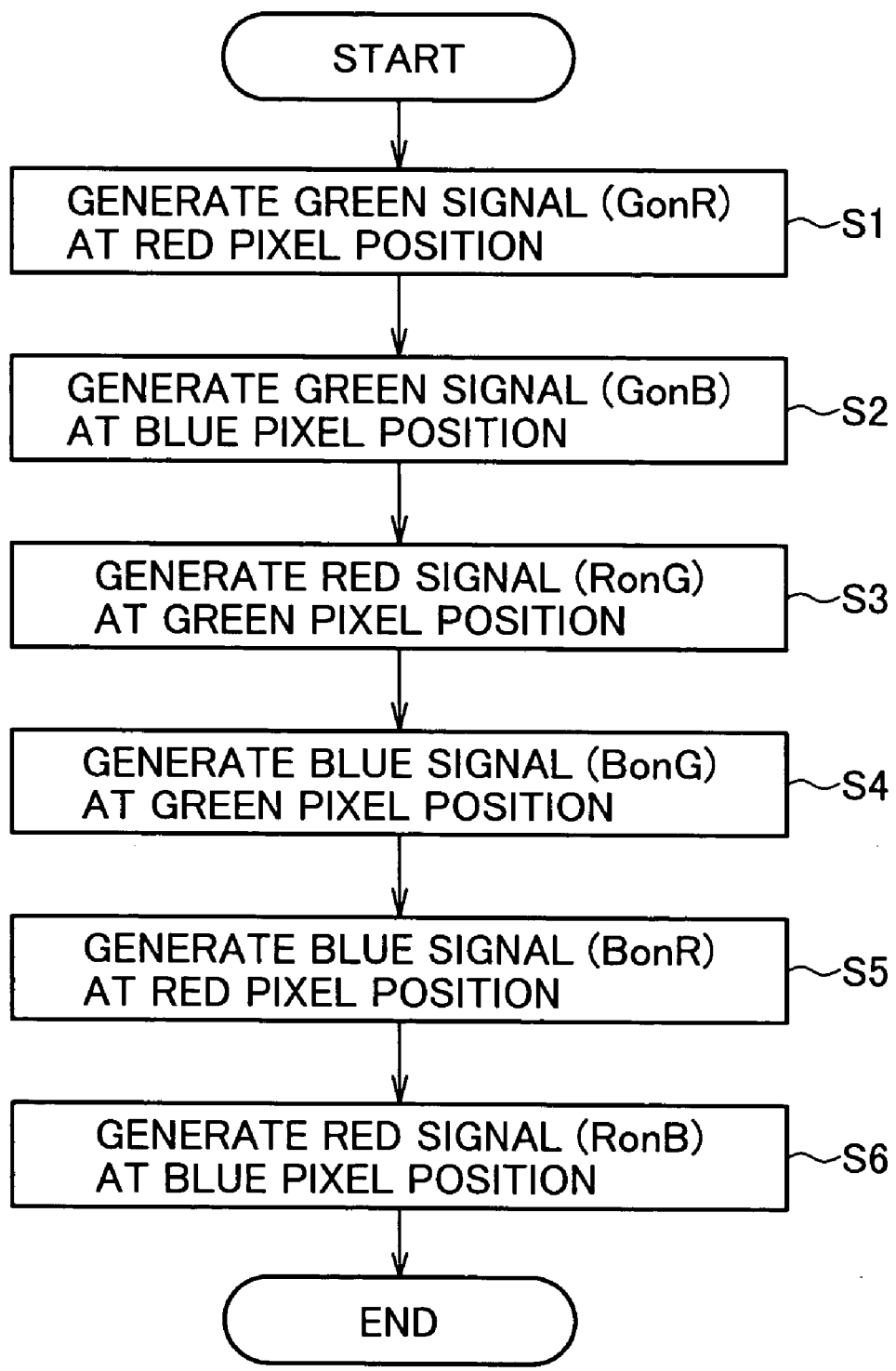
FIG. 17 is a flowchart of an interpolation procedure in the first and a second embodiment of the invention.

The pixel interpolation calculations are carried out according to the flowchart shown in FIG. 17, as in the first embodiment. When all six processing steps shown in the flowchart have been completed, pixel signals are present for the missing colors at all pixels positions on one screen.

The specific calculation in each step will now be described. First, high-pass and low-pass filtered values for the red, green, and blue signals are calculated according to equations (2) to (13) as in the first embodiment.

First, the calculation process in step S1 will be described. In this step, green signals missing at red pixel positions are calculated. The green signal at a red pixel position is calculated from the following equation (25), which conforms to equation (22). The coordinate values differ from equation (22) because red pixels are present at positions (i+n, j+m), where m and n are odd integers.

$$G(i+n, j+m) = \{R(i+n, j+m) + q(GHPF(i+n, j+m) - RHPF(i+n, j+m))\} \times r \quad (25)$$
$$(GLPF(i+n, j+m)/RLPF(i+n, j+m))$$

The values of coefficients q and r may be determined in advance to ensure optimal image interpolation. Values of q=0.25 and r=1, for example, yield good pixel interpolation results. FIG. 18 shows the two-dimensional positions of the green signals gr obtained at red pixel positions by interpolation according to equation (25).

Next comes the calculation process in step S2. In this step, green signals missing at blue pixel positions are interpolated. The green signal at a blue pixel position is calculated from the following equation (26), which conforms to equation (22). The coordinate values differ from equation (22) because blue pixels are present at positions (i+s, j+t), where s and t are even integers.

$$G(i+s, j+t) = \{B(i+s, j+t) + q(GHPF(i+s, j+t) - BHPF(i+s, j+t))\} \times r(GLPF(i+s, j+t)/BLPF(i+s, j+t)) \quad (26)$$

FIG. 19 shows green signals gb obtained at blue pixel positions by interpolation according to equation (26). FIG. 19 also shows the signals gr obtained by interpolation according to equation (25). Green signals at all pixel positions can be obtained by green signal interpolation at red pixel positions according to equation (25) and green signal interpolation at blue pixel positions according to equation (26).

Next comes the calculation process in step S3. In this step, red signals missing at green pixel positions are interpolated. The red signal at a green pixel position is calculated from the following equations (27) and (28), which conform to equation (22). The coordinate values differ from equation (22) because green pixels are present at positions (i+n, j+t), where n is an odd integer and t is an even integer.

$$R(i+s, j+m) = \{G(i+s, j+m) + q(RHPF(i+s, j+m) - GHPF(i+s, j+m))\} \times r(RLPF(i+s, j+m)/GLPF(i+s, j+m)) \quad (27)$$

-continued $$R(i+n, j+t) = \{G(i+n, j+t) + q(RHPF(i+n, j+t) - \\ GHPF(i+n, j+t))\} \times r(RLPF \\ (i+n, j+t)/GLPF(i+n, j+t)) \quad (28)$$

FIG. 20 shows the two-dimensional positions of the red signals rg obtained at green pixel positions by interpolation according to equations (27) and (28).

As above, RLPF, RHPF, GLPF, and GHPF in equations (27) and (28) are the output values of the low-pass and high-pass filters, but GLPF and GHPF may be recalculated using the interpolated gr and gb values calculated in steps S1 and S2.

Next comes the calculation process in step S4. In this step, blue signals missing at green pixel positions are interpolated. The blue signal at a green pixel position is calculated from the following equations (29) and (30), which conform to equation (22). The coordinate values differ from equation (22) because green pixels are present at positions (i+s, j+m), where s is an even integer and m is an odd integer, and (i+n, j+t), where n is an odd integer and t is an even integer.

$$B(i+s, j+m) = \{G(i+s, j+m) + q(BHPF(i+s, j+m) - \\ GHPF(i+s, j+m))\} \times r \\ (BLPF(i+s, j+m)/GLPF(i+s, j+m)) \quad (29)$$

$$B(i+n, j+t) = \{G(i+n, j+t) + q(BHPF(i+n, j+t) - \\ GHPF(i+n, j+t))\} \times r \\ (BLPF(i+n, j+t)/GLPF(i+n, j+t)) \quad (30)$$

FIG. 21 shows the two-dimensional positions of the blue signals bg obtained at green pixel positions by interpolation according to equations (29) and (30).

As above, BLPF, BHPF, GLPF, and GHPF in equations (29) and (30) are the output values of the low-pass and high-pass filters, but GLPF and GHPF may be recalculated using the interpolated gr and gb values calculated in steps S1 and S2.

Next comes the calculation process in step S5. In this step, red signals missing at blue pixel positions are interpolated. The red signal at a blue pixel position is calculated from the following equation (31), which conforms to equation (22). The coordinate values differ from equation (22) because blue pixels are present at positions (i+s, j+t), where s and t are even integers.

$$R(i+s, j+t) = \{G(i+s, j+t) + q(RHPF(i+s, j+t) - \\ GHPF(i+s, j+t))\} \times r(RLPF \\ (i+s, j+t)/GLPF(i+s, j+t)) \quad (31)$$

FIG. 22 shows the two-dimensional positions of the red signals rb obtained at blue pixel positions by interpolation according to equation (31). FIG. 22 also shows the red signals rg obtained at green pixel positions by interpolation according to equations (27) and (28). Red signals for all the pixels are obtained by interpolation according to equations (27), (28) and (31).

As above, RLPF, RHPF, GLPF, and GHPF in equation (31) are the output values of the low-pass and high-pass filters, but GLPF and GHPF may be recalculated using the interpolated gr and gb values calculated in steps S1 and S2. RLPF and RHPF may also be recalculated using the interpolated rg values calculated in step S3.

Next comes the calculation process in step S6. In this step, blue signals missing at red pixel positions are interpolated. The blue signal at a red pixel position is calculated from the following equation (32), which conforms to equation (22). The coordinate values differ from equation (22) because red pixels are present at positions (i+n, j+m), where m and n are odd integers.

$$B(i+n, j+m) = \{G(i+n, j+m) + q(BHPF(i+n, j+m) - \\ GHPF(i+n, j+m))\} \times r \\ (BLPF(i+n, j+m)/GLPF(i+n, j+m)) \quad (32)$$

FIG. 23 shows the two-dimensional positions of the blue signals br obtained at red pixel positions by interpolation according to equation (32). FIG. 23 also shows the blue signals bg obtained by interpolation according to equations (18) and (19). Blue signals for all the pixels are obtained by interpolation according to equations (18), (19) and (32).

As above, BLPF, BHPF, GLPF, and GHPF in equation (32) are the output values of the low-pass and high-pass filters, but GLPF and GHPF may be recalculated using the interpolated gr and gb values calculated in steps S1 and S2. BLPF and BHPF may also be recalculated using the interpolated values bg calculated in step S4.

From the calculations in steps S1 to S6 above, the color signals missing at each pixel can be interpolated and red, green, blue signals can be obtained for all the pixels.

It can be readily appreciated that the color signals can be generated in any appropriate order, not limited to the order indicated in FIG. 17. For example, the order of calculation can be reversed between steps S1 and S2, steps S3 and S4 and steps S5 and S6

The equations in the first and second embodiments express two-dimensional filtering by the low-pass and high-pass filters, but it is possible to determine the degree of correlation among the output signals neighboring the pixel of interest and use only the output signals of pixels aligned in a direction of strong correlation as output values of the high-pass and low-pass filters.

Furthermore, at least some of the high-pass filters 7r, 7g, 7b and low-pass filters 8r, 8g, 8b and the calculating means 10 described in the first and second embodiments can be implemented by software, i.e., by a programmed computer. Furthermore, although the invention has been described in the form of pixel signal processing apparatus, the methods of pixel signal processing disclosed in relation to the apparatus also constitute part of the invention.

When interpolation is carried out by the methods described in the first and second embodiments, pixel interpolation using correlation can be carried out when the red, green, and blue signals are mutually correlated, but accurate pixel interpolation can also be carried out even at locations such as edges where the color signals are uncorrelated. Thus, the inventive method outperforms the method disclosed in Patent Document 1 (Japanese Patent Application Publication No. 2000-197512) above, which suffers from the problem of image degradation such as black or white tinges near color boundaries.

What is claimed is:

1. A pixel signal processing apparatus for processing pixel signals from pixels arrayed in a two-dimensional plane, each pixel having a different one of N spectral characteristics, to generate an interpolated pixel signal having a k-th spectral characteristic at a pixel interpolation position occupied by a pixel having an h-th spectral characteristic, where h and k are positive integers between 1 and N, inclusive, the pixel signal processing apparatus comprising:

a difference calculation means for calculating a difference between a low-frequency component of pixel signals having the k-th spectral characteristic in a plurality of pixel positions in a neighborhood of the pixel interpolation position and a low-frequency component of pixel signals having the h-th spectral characteristic in a plurality of pixel positions in the neighborhood of the pixel interpolation position;

a non-correlation value calculating means for calculating a non-correlation value corresponding to a degree of non-correlation between the pixel signals having the k-th spectral characteristic and the pixel signals having the h-th spectral characteristic in the neighborhood of the pixel interpolation position; and an interpolated value calculating means for obtaining the pixel signal having the k-th spectral characteristic at the pixel interpolation position from the pixel signal having the h-th spectral characteristic at the pixel interpolation position, the difference, and the non-correlation value.

2. The pixel signal processing apparatus of claim 1, wherein the interpolated value calculating means obtains the pixel signal having the k-th spectral characteristic at the pixel interpolation position by adding the pixel signal having the h-th spectral characteristic at the pixel interpolation position, a product of the non-correlation value and a first prescribed coefficient, and a product of the difference and a second prescribed coefficient.

3. The pixel signal processing apparatus of claim 1, wherein the difference calculation means comprises:

a plurality of low-pass filters for generating low-frequency components of the pixel signals having the N spectral characteristics;

a selecting means for selecting the low-frequency component of the pixel signal having the k-th spectral characteristic and the low-frequency component of the pixel signal having the h-th spectral characteristic from the low-frequency components output from the plurality of low-pass filters; and a difference calculating means for calculating the difference between the low-frequency component of the pixel signals having the k-th spectral characteristic and the low-frequency component of the pixel signals having the h-th spectral characteristic.

4. A pixel signal processing apparatus for processing pixel signals from pixels arrayed in a two-dimensional plane, each pixel having a different one of N spectral characteristics, to generate an interpolated pixel signal having a k-th spectral characteristic at a pixel interpolation position occupied by a pixel having an h-th spectral characteristic, where h and k are integers between 1 and N, inclusive, the pixel signal processing apparatus comprising:

a ratio calculation means for calculating a ratio of a low-frequency component of pixel signals having the k-th spectral characteristic in a plurality of pixel positions in a neighborhood of the pixel interpolation position to a low-frequency component of pixel signals having the h-th spectral characteristic in a plurality of pixel positions in the neighborhood of the pixel interpolation position;

a non-correlation value calculating means for calculating a non-correlation value corresponding to a degree of non-correlation between the pixel signals having the k-th spectral characteristic and the pixel signals having the h-th spectral characteristic in the neighborhood of the pixel interpolation position; and an interpolated value calculating means for obtaining the pixel signal having the k-th spectral characteristic at the pixel interpolation position from the pixel signal having the h-th spectral characteristic at the pixel interpolation position, the calculated ratio, and the non-correlation value, wherein:

the pixel signal having the k-th spectral characteristic at the pixel interpolation position is obtained by multiplying the sum of the pixel signal having the h-th spectral characteristic at the pixel interpolation position and the product of the non-correlation value and a first prescribed coefficient by the product of the calculated ratio and a second prescribed coefficient.

5. The pixel signal processing apparatus of claim 1, wherein the non-correlation calculating means comprises:

a varying component generating means for generating a varying component of the pixel signals having the k-th spectral characteristic in the neighborhood of the pixel interpolation position and a varying component of the pixel signals having the h-th spectral characteristic in the neighborhood of the pixel interpolation position; and a difference calculating means for calculating, as the non-correlation value, a difference between the varying component of the pixel signals having the k-th spectral characteristic and the varying component of the pixel signals having the h-th spectral characteristic generated in the varying component generating means.

6. A pixel signal processing method for processing pixel signals from pixels arrayed in a two-dimensional plane, each pixel having a different one of N spectral characteristics, to generate an interpolated pixel signal having a k-th spectral characteristic at a pixel interpolation position occupied by a pixel having an h-th spectral characteristic, where h and k are integers between 1 and N, inclusive, the pixel signal processing method comprising:

a difference calculation step for calculating a difference between a low-frequency component of pixel signals having the k-th spectral characteristic in a plurality of pixel positions in a neighborhood of the pixel interpolation position and a low-frequency component of pixel signals having the h-th spectral characteristic in a plurality of pixel positions in the neighborhood of the pixel interpolation position;

a non-correlation value calculating step for calculating a non-correlation value corresponding to a degree of non-correlation between the pixel signals having the k-th spectral characteristic and the pixel signal having the h-th spectral characteristic in the neighborhood of the pixel interpolation position; and an interpolated value calculating step for obtaining the pixel signal having the k-th spectral characteristic at the pixel interpolation position from the pixel signal having the h-th spectral characteristic at the pixel interpolation position, the difference, and the non-correlation value.

7. The pixel signal processing method of claim 6, wherein the interpolated value calculating step obtains the pixel signal having the k-th spectral characteristic at the pixel interpolation position by adding the pixel signal having the h-th spectral characteristic at the pixel interpolation position, a product of the non-correlation value and a first prescribed coefficient, and a product of the difference and a second prescribed coefficient.

8. The pixel signal processing method of claim 6, wherein the difference calculation step comprises:
- a low-pass filtering step for generating low-frequency components of the pixel signals having N spectral characteristics;
- a selecting step for selecting the low-frequency component of the pixel signal having the k-th spectral characteristic and the low-frequency component of the pixel signal having h-th spectral characteristic from the low-frequency components obtained by filtering in the low-pass filtering step; and
- a difference calculating step for calculating the difference between the low-frequency component of the pixel signals having k-th spectral characteristic and the low-frequency component of the pixel signals having the h-th spectral characteristic, selected in the selecting step.

9. A pixel signal processing method for processing pixel signals from pixels arrayed in a two-dimensional plane, each pixel having a different one of N spectral characteristics, to generate an interpolated pixel signal having a k-th spectral characteristic at a pixel interpolation position occupied by a pixel having an h-th spectral characteristic, where h and k are integers between 1 and N, inclusive, the pixel signal processing method comprising:
- a ratio calculation step for calculating a ratio of a low-frequency component of pixel signals having the k-th spectral characteristic in a plurality of pixel positions in a neighborhood of the pixel interpolation position to a low-frequency component of pixel signals having the h-th spectral characteristic in a plurality of pixel positions in the neighborhood of the pixel interpolation position;
- a non-correlation value calculating step for calculating a non-correlation value corresponding to a degree of non-correlation between the pixel signals having the k-th spectral characteristic and the pixel signals having the h-th spectral characteristic in the neighborhood of the pixel interpolation position; and
- an interpolated value calculating step for obtaining the pixel signal having the k-th spectral characteristic at the pixel interpolation position from the pixel signal having the h-th spectral characteristic at the pixel interpolation position, the calculated ratio, and the non-correlation value, wherein:
- the pixel signal having the k-th spectral characteristic at the pixel interpolation position is obtained by multiplying the sum of the pixel signal having the h-th spectral characteristic at the pixel interpolation position and the product of the non-correlation value and a first prescribed coefficient by the product of the calculated ratio and a second prescribed coefficient.

10. The pixel signal processing method of claim 6, wherein the non-correlation value calculating step comprises:
- a varying component generating step for generating a varying component of the pixel signals having the k-th spectral characteristic in the neighborhood of the pixel interpolation position and a varying component of the pixel signals having the h-th spectral characteristic in the neighborhood of the pixel interpolation position; and
- a difference calculating step for calculating, as the non-correlation value, a difference between the varying component of the pixel signals having the k-th spectral characteristic and the varying component of the pixel signals having the h-th spectral characteristic generated in the varying component generating step.

* * * * *